US008584109B2

(12) United States Patent
Anckaert et al.

(10) Patent No.: US 8,584,109 B2
(45) Date of Patent: Nov. 12, 2013

(54) VIRTUALIZATION FOR DIVERSIFIED TAMPER RESISTANCE

(75) Inventors: Bertrand Anckaert, Ghent (BE); Mariusz H. Jakubowski, Bellevue, WA (US); Ramarathnam Venkatesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1868 days.

(21) Appl. No.: 11/553,841

(22) Filed: Oct. 27, 2006

(65) Prior Publication Data

US 2008/0127125 A1    May 29, 2008

(51) Int. Cl.
G06F 9/44 (2006.01)
G06F 9/45 (2006.01)
G06F 9/30 (2006.01)

(52) U.S. Cl.
USPC ........... 717/148; 717/100; 717/114; 717/136; 717/139; 712/226

(58) Field of Classification Search
None
See application file for complete search history.

(56) References Cited

U.S. PATENT DOCUMENTS

| 6,006,328 | A  * | 12/1999 | Drake ............................. 726/23 |
| 6,092,202 | A  * | 7/2000  | Veil et al. ....................... 726/27 |
| 6,292,883 | B1 * | 9/2001  | Augusteijn et al. ........... 712/209 |
| 6,298,434 | B1 * | 10/2001 | Lindwer ........................ 712/209 |
| 6,594,761 | B1 * | 7/2003  | Chow et al. ................... 713/190 |
| 6,643,775 | B1 * | 11/2003 | Granger et al. ............... 713/190 |
| 7,051,200 | B1   | 5/2006  | Manferdelli et al. |
| 7,065,755 | B2 * | 6/2006  | Daynes et al. ................ 717/148 |
| 7,114,055 | B1 * | 9/2006  | Baxter ............................ 712/37 |
| 7,162,711 | B2 * | 1/2007  | Czajkowski et al. ......... 717/114 |
| 7,376,949 | B2 * | 5/2008  | Lowell et al. ..................... 718/1 |
| 8,296,742 | B2 * | 10/2012 | Biswas et al. ................. 717/136 |
| 8,370,819 | B2 * | 2/2013  | Chakraborty et al. ........ 717/148 |
| 8,429,630 | B2 * | 4/2013  | Nickolov et al. ............. 717/148 |
| 2002/0194243 | A1 * | 12/2002 | Sokolov et al. ............... 709/101 |
| 2003/0097577 | A1 * | 5/2003  | Sotoodeh et al. ............. 713/189 |
| 2004/0117532 | A1 * | 6/2004  | Bennett et al. ................ 710/260 |
| 2005/0039180 | A1 * | 2/2005  | Fultheim et al. .................. 718/1 |
| 2005/0066324 | A1   | 3/2005  | Delgado et al. |
| 2005/0076324 | A1 * | 4/2005  | Lowell et al. ................. 717/100 |
| 2005/0091652 | A1 * | 4/2005  | Ross et al. ......................... 718/1 |

(Continued)

FOREIGN PATENT DOCUMENTS

| JP | 2004348710 | 12/2004 |
| JP | 2005129066 | 5/2005 |

(Continued)

OTHER PUBLICATIONS

ASCI Design fro conditional Nested loop with Predicate Registers, Bryce Sinclair et al., Date: 1999, IEEE, pp. 874-877.*

(Continued)

*Primary Examiner* — Thuy Dao
*Assistant Examiner* — Ziaul A Chowdhury
(74) *Attorney, Agent, or Firm* — Lee & Hayes, PLLC

(57) ABSTRACT

A computer-implementable method includes providing an instruction set architecture that comprises features to generate diverse copies of a program, using the instruction set architecture to generate diverse copies of a program and providing a virtual machine for execution of one of the diverse copies of the program. Various exemplary methods, devices, systems, etc., use virtualization for diversifying code and/or virtual machines to thereby enhance software security.

20 Claims, 15 Drawing Sheets

(56) References Cited

U.S. PATENT DOCUMENTS

| | | | |
|---|---|---|---|
| 2005/0108440 A1* | 5/2005 | Baumberger et al. | 710/1 |
| 2005/0216920 A1* | 9/2005 | Tewari et al. | 719/324 |
| 2006/0005188 A1* | 1/2006 | Vega et al. | 718/1 |
| 2006/0123416 A1* | 6/2006 | Cibrario Bertolotti et al. | 718/1 |
| 2006/0136720 A1* | 6/2006 | Armstrong et al. | 713/164 |
| 2006/0136867 A1* | 6/2006 | Schneider et al. | 717/106 |
| 2006/0218539 A1* | 9/2006 | Stiemens et al. | 717/140 |
| 2007/0022275 A1* | 1/2007 | Sweedler | 712/226 |

FOREIGN PATENT DOCUMENTS

| | | |
|---|---|---|
| JP | 2005266887 | 9/2005 |
| RU | 2004128233 | 3/2006 |
| WO | WO2005052841 | 6/2005 |
| WO | WO2005125081 | 12/2005 |

OTHER PUBLICATIONS

Software Pipelining for Packet Filters, Yoshiyuki Yamashita et al., Date: 2007, Saga University Japan, pp. 446-459.*

Markus Jochim, "Automatic Generation of Diversified Program Variants Optimized to Detect Hardware Faults", [Online], 1999, pp. 1-6, [Retrieved from Internet on Jun. 30, 2013], <http://citeseerx.ist.psu.edu/viewdoc/download?doi=10.1.1.92.219&rep=rep1&type=pdf>.*

Anh Nguyen-Tuong et al., "Security through Redundant Data Diversity", [Online], 2008, pp. 1-10, [Retrieved from Internet on Jun. 30, 2013], <http://dependability.cs.virginia.edu/publications/2008/DCCS-anh-nguyen-tuong.pdf>.*

Naeem Zafar Azeemi,"Handling Architecture-Application Dynamic Behavior in Set-top Box Applications", [Online], 2006, pp. 195-200, [Retrieved from Internet on Jun. 30, 2013], <http://citeseerx.ist.psu.edu/viewdoc/download?doi=10.1.1.118.8445&rep=rep1&type=pdf>.*

Ioannis E. Venetis et al., "Mapping the LU Decomposition on a Many-Core Architecture: Challenges and Solutions", [Online], ACM 2009, pp. 1-10, [Retrieved from Internet on Jun. 30, 2013], <http://citeseerx.ist.psu.edu/viewdoc/download?doi=10.1.1.212.9349&rep=rep1&type=pdf>.*

Linger, "Systematic Generation of Stochastic Diversity as an Intrusion Barrier in Survivable Systems Software", Proceedings of the 32nd Annual Hawaii International Conference on System Sciences, Jan. 1999, see abstract and chapters 3-7.

Michael, et al., "Two Systems for Automatic Software Diversification", Proceedings of 2000 DARPA Information Survivability Conference and Exposition, vol. 2, Jan. 2000, pp. 220-230, see abstract and chapters 4 and 5.

PCT Search Report for PCT Application No. PCT/US2007/081485, mailed Dec. 23, 2008 (9 pages).

Translated Japanese Office Action mailed Mar. 23, 2012 for Japanese patent application No. 2009-534768, a counterpart foreign application of U.S. Appl. No. 11/553,841, 10 pages.

Translated Chinese Office Action mailed Mar. 25, 2011 for Chinese Patent Application No. 200780039607.9, a counterpart foreign application of U.S. Appl. No. 11/553,841.

The Australian Office Action mailed Jun. 23, 2011 for Australian patent application No. 2007349213, a counterpart foreign application of U.S. Appl. No. 11/553,841.

Translated Japanese Office Action mailed Oct. 12, 2012 for Japanese patent application No. 2009-534768, a counterpart foreign application of US patent application No. 318591.01, 16 pages.

The Russian Office Action mailed Oct. 18, 2011 for Russian patent application No. 2009115656, a counterpart foreign application of U.S. Appl. No. 11/553,841, 5 pages.

* cited by examiner

VIRTUALIZATION FOR DIVERSIFIED TAMPER RESISTANCE

BACKGROUND

Despite huge efforts by software providers, software protection mechanisms are still broken on a regular basis. Further, a successful attack on one copy can often be replicated automatically on other copies. For example, if a software provider distributes evaluation versions of a piece of software, a crack that removes the time limitation from one copy can be applied to all other distributed copies as well. Yet further, conventional distribution models can allow for serial attacks that quickly affect thousands of users.

Diversification is a concept that can be used to enhance software security and confound attack. However, diversification techniques developed for software security are not always transferable to software protection as different rules can apply. For example, most of the run-time diversification introduced for security could easily be turned off when an attacker has physical access to the program and execution environment.

As described herein, various diversity techniques for software protection provide renewable defenses in space and in time, for example, by giving every user a different copy and renewing defenses with tailored updates.

SUMMARY

Various exemplary techniques use virtualization for diversifying code and/or virtual machines (VMs) to thereby enhance software security. For example, a computer-implementable method includes providing an instruction set architecture (ISA) that comprises features to generate diverse copies of a program, using the instruction set architecture to generate diverse copies of a program and providing a VM for execution of one of the diverse copies of the program. Various other exemplary technologies are also disclosed.

DRAWINGS

Non-limiting and non-exhaustive examples are described with reference to the following figures.

DETAILED DESCRIPTION

Overview

Figure 1:
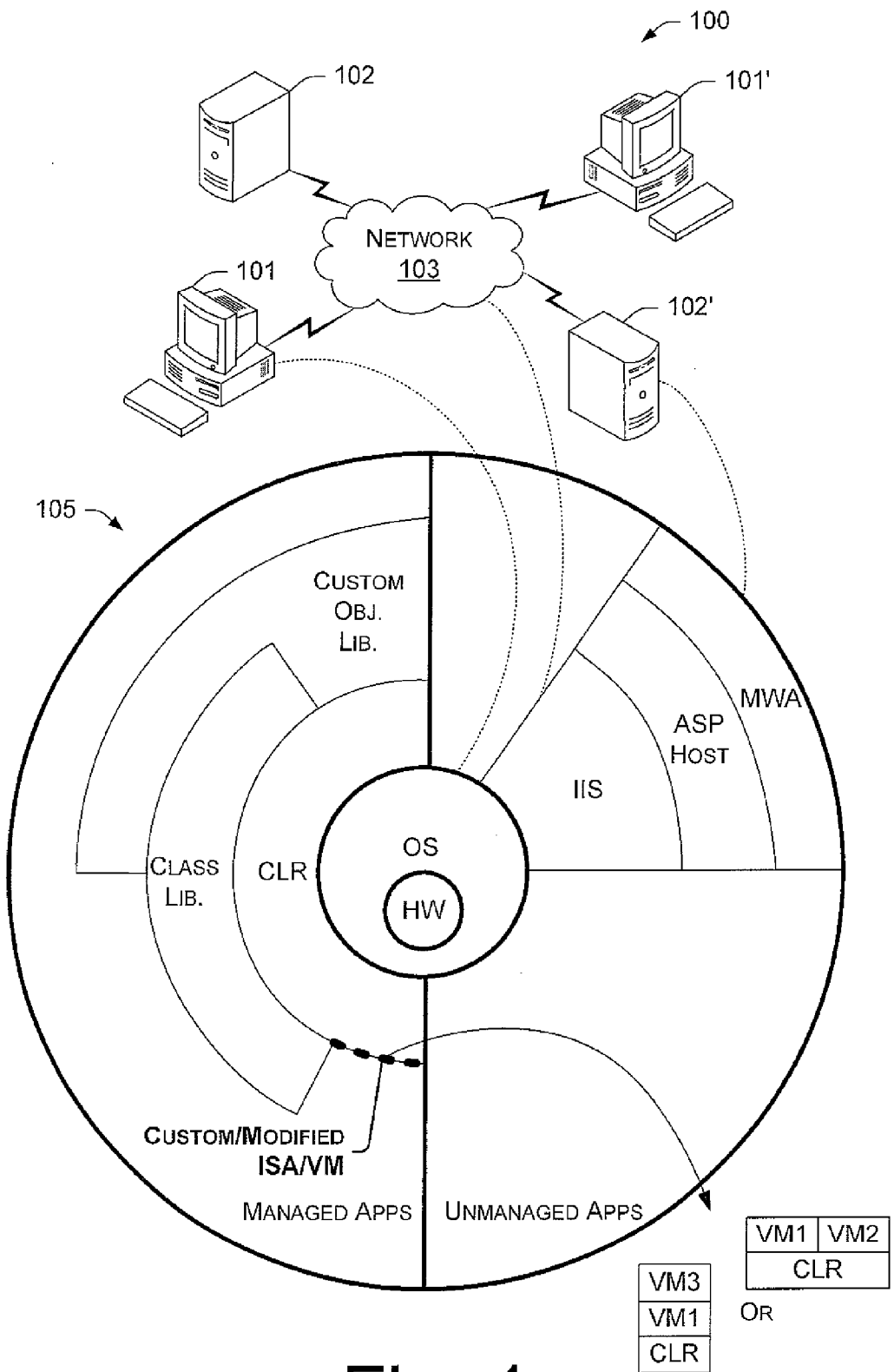
FIG. 1 is a diagram of a system and an overall architecture that includes a virtualization layer as a custom/modified instruction set architecture (ISA) and/or a virtual machine (VM)

Exemplary techniques use software-based security for code that executes on a virtual machine or other machine that can be controlled (e.g., operated in a particular manner). Various examples modify code, modify data and/or modify virtual machine operation in a cooperative manner to enhance security. For example, features associated with code can be identified and used to diversify instances of the code. Various examples include use of a custom or modified Instruction Set Architecture (ISA) that is emulated on top of an existing architecture or modified architecture. Where the existing architecture includes a virtualization layer (e.g., a virtual machine or runtime engine or simply "runtime"), an exemplary approach may add another virtualization layer on top of the existing virtualization layer. Implementation of various techniques may occur through use of a custom virtual machine that operates on top of an underlying virtual machine or through use of a modified virtual machine (e.g., modification of an underlying virtual machine). For increased security at the expense of performance, such a process may be iterated to generate a stack of virtual machines, each of which virtualizes the instruction set of the machine directly underneath.

With respect to diversification, an analogy may be made to genetic diversity where common components (e.g., DNA building blocks) are assembled in a variety of manners to thereby enhance diversity of a species. In turn, a malicious agent (e.g., a virus) is unlikely to affect all members of the genetically diverse species. An analogy also exists for some parasites where hundreds of genes may manufacture proteins that are mixed and matched. Such protein diversity helps such a parasite evade immune system detection. However, while genetic diversity in species is often associated with phenotypic diversity (i.e., diversity of expression or manifestation), as described herein, code diversification should not alter a user's experience. In other words, given the same inputs, all instances of a diversified code should execute to produce the same result.

Consider the following generalized equations:

$$\text{genotype} + \text{environment} = \text{phenotype} \tag{1}$$

$$\text{code/data} + \text{machine} = \text{result} \tag{2}$$

In Eqn. 2, with diversified code and/or data, the machine can be a custom machine or a modified or controlled machine that ensures that the result is substantially the same. Where a virtual machine or virtual machines are used, the underlying hardware and/or operating system is typically unaffected by the exemplary security approaches described herein; noting, however, that such approaches may increase computational demand.

As described herein, code diversification increases security by confounding attack. In addition, code diversity can confound serial attacks as replication of a successful attack on one instance of the code is unlikely to succeed on a "genetically" different instance of the code. Further, data (or datastructure) may be diversified to increase security. Yet further, exemplary techniques for diversifying a custom or a modified virtual machine may be used to enhance security with or without code and/or data diversification.

While various examples focus on generation of individualized bytecodes from MSIL binaries, various exemplary techniques may be used for programs expressed in any programming language, intermediate language, bytecode or manner.

As described herein, the process of virtualization (e.g., execution of code on a virtual machine or virtual environment) facilitates (i) the ability to make many different versions of a program and (ii) the ability to make every instance of a program resilient against attack. Various exemplary techniques use virtualization to emulate a custom Instruction Set Architecture (ISA) on top of a portable, verifiable managed CLR environment. A custom runtime or a modified runtime may be used to emulate the custom ISA, i.e., in some manner, the underlying runtime must be able to manage the diversity introduced via the custom ISA.

Virtualization provides degrees of freedom that can be used in diversification. For example, an Instruction Set Architecture (ISA) (e.g., and/or micro-architecture) typically includes (1) instruction semantics, (2) instruction encoding, (3) opcode encoding, (4) code representation and a program counter, and (5) a corresponding internal implementation of a virtual machine. Given these degrees of freedom, various exemplary methods can generate many diverse copies of a program with any of a variety of protection mechanisms.

Degrees of freedom associated with an ISA provide for design and selection of tamper-resistant programs. For example, tamper-resistance can be the result of (1) making local modifications more difficult through (a) variable instruction lengths, (b) limited instruction sets, and encouraging (c) physical and (d) semantic overlap; (2) making global modifications more difficult by all of the previous and blurring the boundaries between code, data and addresses; (3) making instruction semantics variable; and (4) constantly relocating the code.

More specific examples include (i) randomizing instruction semantics by building instructions through the combination of smaller instructions; (ii) choosing instruction semantics to enable increased semantic overlap; (iii) departing from the traditional linear code representation to representing the code as a data structure such as a self-adapting (splay) binary tree; (iv) assigning variable lengths to opcodes and operands to complicate disassembly and to make local modifications more difficult; (v) limiting the instruction set to give the attacker fewer options in analyzing and modifying code; and (vi) making variable the mapping between bit patterns, opcodes and operands. Some of these examples are described in more detail below. The detailed description includes the best mode currently contemplated.

Prior to describing various details, for purposes of context, FIG. 1 shows a general system 100 and architecture 105 that includes virtualization. The architecture 105 further shows a custom and/or modified ISA and/or virtual machine in relationship to a virtual machine referred to as a common language runtime (CLR) The CLR in FIG. 1 is, for example, a CLR capable of handling an intermediate language code derived from any of a variety of object-oriented programming languages (OOPLs), hence, the term "common". While FIG. 1 is discussed with reference to the .NET™ framework (Microsoft Corp, Redmond, Wash.), exemplary techniques may be used with other architectures.

The system 100 includes various computing devices 101, 101', 102, 102' in communication via a network 103. The devices 101, 101' may be clients (e.g., PCs, workstations, light-weight devices, smart devices, etc.) while the devices 102, 102' are servers. The architecture 105 is shown with some links to the device 101, the server 102' and the network 103.

The .NET™ framework has two main components: the common language runtime (CLR) and the .NET™ framework class library. These are shown as associated with managed applications. The CLR is a virtual machine (VM) at the foundation of the .NET™ framework. The CLR acts as an agent that manages code at execution time, providing core services such as memory management, thread management, and remoting, while also enforcing strict type safety and other forms of code accuracy that promote security and robustness. The concept of code management is a fundamental principle of the CLR. Code that targets the CLR is known as managed code, while code that does not target the runtime is known as unmanaged code (right half of architecture).

In the .NET™ framework programs are executed within a managed execution environment provided by the CLR. The CLR greatly improves runtime interactivity between programs, portability, security, development simplicity, cross-language integration, and provides an excellent foundation for a rich set of class libraries. Each language targeting the .NET™ framework CLR compiles source code and produces metadata and Microsoft® Intermediate Language (MSIL) code. While various examples mention MSIL, various exemplary security techniques may be used with other language code. For example, various techniques may be used with most any low-level assembler-style language (e.g., any intermediate language (IL) code). Various techniques may be used with bytecodes such as those of the JAVA™ framework (Sun Microsystem, Sunnyvale, Calif.).

In the .NET™ framework, program code typically includes information known as "metadata", or data about data. Metadata often includes a complete specification for a program including all its types, apart from the actual implementation of each function. These implementations are stored as MSIL, which is machine-independent code that describes the instructions of a program. The CLR can use this "blueprint" to bring a .NET™ program to life at runtime, providing services far beyond what is possible with the traditional approach that relies on compiling code directly to assembly language.

The class library, the other main component of the .NET™ framework, is a comprehensive, object-oriented collection of reusable types to develop applications ranging from traditional command-line or graphical user interface (GUI) applications to applications based on the latest innovations provided by ASP.NET, such as Web Forms and XML Web services.

While the CLR is shown on the managed application side of the architecture 105, the .NET™ framework can be hosted by unmanaged components that load the CLR into their processes and initiate the execution of managed code, thereby creating a software environment that can exploit both managed and unmanaged features. The NET™ framework not only provides several runtime hosts, but also supports the development of third-party runtime hosts.

For example, ASP.NET hosts the runtime (RT) to provide a scalable, server-side environment for managed code. ASP.NET works directly with the runtime to enable ASP.NET applications and XML Web services.

The Internet Explorer® browser application (Microsoft Corp.) is an example of an unmanaged application that hosts the runtime (e.g., in the form of a MIME type extension). Using the Internet Explorer® software to host the runtime enables a user to embed managed components or Windows Forms controls in HTML documents. Hosting the runtime in this way makes managed mobile code (similar to Microsoft® ActiveX® controls) possible, but with significant improvements that only managed code can offer, such as semi-trusted execution and isolated file storage.

As described herein, managed code can be any code that targets a runtime (e.g., a virtual machine, runtime engine, etc., where the runtime interfaces with an underlying operating system (OS) typically directly associated with control of hardware (HW)). In the .NET™ framework, managed code targets the CLR and typically includes extra information known as metadata that "describe itself". Whilst both managed and unmanaged code can run in the CLR, managed code includes information that allows the CLR to guarantee, for instance, safe execution and interoperability.

In addition to managed code, managed data exists in the architecture of the .NET™ framework. Some .NET™ languages use managed data by default (e.g., C#, Visual Basic.NET, JScript.NET) whereas others (e.g., C++) do not. As with managed and unmanaged code, use of both managed and unmanaged data in .NET™ applications is possible (e.g., data that does not get garbage collected but instead is looked after by unmanaged code).

A program or code is typically distributed as a portable executable file (e.g., a "PE"). In a .NET™ PE, the first block of data within the PE wrapper is MSIL, which, as already mentioned, looks approximately like a low-level assembler language code. The MSIL is conventionally what is compiled and executed in the .NET™ framework. A second block of data with the PE is conventionally the metadata and describes the contents of the PE (e.g., what methods it provides, what parameters they take, and what they return). A third block of data is referred to as the manifest, which conventionally describes what other components the executable needs in order to run. The manifest may also contains public keys of external components, so that the CLR can ensure that the external component is properly identified (i.e., the component required by the executable).

When running the executable, the .NET™ CLR can use Just-In-Time (JIT) compilation. JIT compiling enables all managed code to run in the native machine language of the system on which it is executing (OS/HW). According to JIT, as each method within the executable gets called, it gets compiled to native code and, depending on configuration, subsequent calls to the same method do not necessarily have to undergo the same compilation, which can reduce overhead (i.e., overhead is only incurred once per method call). Although the CLR provides many standard runtime services, managed code is never interpreted. Meanwhile, the memory manager removes the possibilities of fragmented memory and increases memory locality-of-reference to further increase performance.

Referring again to the architecture 105, the relationship of the CLR and the class library is shown with respect to applications and to the overall system (e.g., the system 100) and shows how managed code operates within a larger architecture.

The CLR manages memory, thread execution, code execution, code safety verification, compilation, and other system services. These features are intrinsic to the managed code that runs on the CLR.

With regards to security, managed components can be awarded varying degrees of trust, depending on a number of factors that include their origin (such as the Internet, enterprise network, or local computer). This means that a managed component might or might not be able to perform file-access operations, registry-access operations, or other sensitive functions, even if it is being used in the same active application.

The CLR can enforce code access security. For example, users can trust that an executable embedded in a Web page can play an animation on screen or sing a song, but cannot access their personal data, file system, or network. The security features of the CLR can thus enable legitimate Internet-deployed software to be exceptionally feature-rich.

The CLR can also enforce code robustness by implementing a strict type-and-code-verification infrastructure called the common type system (CTS). The CTS ensures that all managed code is self-describing. Managed code can consume other managed types and instances, while strictly enforcing type fidelity and type safety.

The managed environment of the CLR aims to eliminate many common software issues. For example, the CLR can automatically handle object layout and manage references to objects, releasing them when they are no longer being used. Such automatic memory management resolves the two most common application errors, memory leaks and invalid memory references. Interoperability between managed and unmanaged code can enable developers to continue to use necessary COM components (component object model) and dlls (dynamic-link libraries).

The .NET™ framework CLR can be hosted by high-performance, server-side applications, such as Microsoft® SQL Server™ and Internet Information Services (IIS). This infrastructure enables use of managed code for writing business logic, while still using enterprise servers that support runtime hosting.

Server-side applications in the managed domain are implemented through runtime hosts. Unmanaged applications host the CLR, which allows custom managed code to control the behavior of a server. Such a model provides features of the CLR and class library while gaining the performance and scalability of a host server.

As already mentioned, various exemplary techniques use virtualization to emulate a custom or modified ISA on top of a portable, verifiable, managed CLR environment. This is shown in the architecture 105 by an exemplary custom/modified ISA and/or VM 107 (dashed arc) that sits on top of the boundary of the CLR and the managed applications space (noting that various examples discuss unmanaged apps as well). This infers that the custom/modified ISA does not interfere with operation of the CLR and the underlying environment or "host" environment (e.g., OS/HW). While a custom ISA may provide for control of the CLR or "VM" to the extent necessary to implement various features of the custom ISA, various examples rely on a custom VM, which may be a modified version of the underlying VM (i.e., a modified CLR). Hence, an exemplary architecture may include a single modified VM or multiple VMs (e.g., a custom VM on top of a targeted VM). To increase security, at some cost of performance, a plurality of VMs may be stacked in a manner such that all but the lowest level VM virtualizes the instruction set of the VM directly underneath.

In FIG. 1, an arrow points to an example where a conventional CLR has a virtualization layer with two types of virtualization VM1 and VM2 on top of it and another example where a conventional CLR has two stacked virtualization layers VM1 and VM3 on top of it In such examples, the underlying CLR could be a custom or proprietary CLR with security features where the additional one or more virtualization layers further enhance security. An exemplary method includes multiple stacked VMs where each VM virtualizes the instruction set of the machine directly underneath. Noting that the lowest level VM typically virtualizes an operating system that controls hardware while other higher level VMs virtualize another VM. As indicated in FIG. 1, various arrangements are possible (e.g., two VMs on top of a VM, stacked VMs, etc.). A multiple "custom" VM approach may be viewed as leveraging virtualization to obtain more security, with some cost in performance.

Referring again to the analogy with genetics and environment, genetics may be considered static while the environment may be considered dynamic. Similarly, various diversity-based approached to tamper-resistance may be static and/or dynamic. In general, a static approach diversifies copies of program code while a dynamic approach diversifies VMs or VM operation or the program operation at runtime. Thus, as described herein, various exemplary techniques include virtualization that works statically, dynamically and/or both statically (e.g., to generate individualized program code) and dynamically (e.g., to vary program operation at runtime)

An exemplary method may include providing an architecture that includes a first virtualization layer and providing a second virtualization layer on top of the first virtualization layer where the second virtualization is configured to receive a diversified copy of a program and allow for execution of the program using the first virtualization layer. Such a method may enhance software security through use of diversification techniques described herein.

An exemplary method may include generating individualized copies of a program code and providing a virtual machine for execution of an individualized copy of the program code wherein the virtual machine can vary program operation at runtime. Such a method may enhance software security through use of diversification techniques described herein.

For sake of convenience, custom and modified ISAs are referred to herein as custom ISAs. A custom ISA may be used to create a set of different copies (or "versions") of a program with the following properties: (i) Each copy in the set has a reasonable level of defense against tampering and (ii) It is hard to retarget an existing attack against one copy to work against another copy. The many choices result in a large space of semantically equivalent programs that can be generated. An approach may consider this entire space to allow for more diversity or, alternatively, an approach may consider only parts of this space which are believed to be, or proven to be, more tamper-resistant than other parts.

Tamper-resistant properties include: (i) Prevent static analysis of the program; (ii) Prevent dynamic analysis of the program; (iii) Prevent local modifications; and (iv) Prevent global medications. The first two are closely related to the problem of obfuscation, while the latter two are more tamper-resistance-oriented. However, intelligent tampering requires at least some degree of program understanding, which is typically gained from observing the static binary, observing the running executable or a combination and/or repetition of the two previous techniques.

Various ISAs exist, for example, CISC, RISC and more recently Java™ bytecode and managed MSIL. However, the latter two tend to be more easily analyzed due to a number of reasons. First, binaries are typically not executed directly on hardware, but need to be emulated or translated into native code before execution. To enable this, boundaries between code and data need to be known and there can be no confusion between constant data and relocatable addresses. This, of course, comes with the advantage of portability. Besides portability, design principles include support for typed memory management and verifiability. To assure verifiability, pointer arithmetic is not allowed, control flow is restricted, etc. To enable typed memory management, a lot of information needs to be communicated to the executing environment about the types of objects.

All of these design principles have led to binaries that are easy to analyze by the executing environment, but are equally easy to analyze by an attacker. This has led to the creation of decompilers for both Java™ and managed MSIL binaries.

In general, a trend exists where design principles of ISAs are becoming increasingly in conflict with design principles that would facilitate software protection.

As described herein, an exemplary technique to counter this trend adds an additional layer of virtualization (or optionally multiple additional layers of virtualization). More specifically, virtualization can be used to emulate a custom ISA on top of a portable, verifiable, managed runtime environment. Consider the following construction: (i) Write an emulator (e.g., a custom virtual machine) for the environment which runs on top of a CLR; (ii) Take the binary representation of a binary and add it as data to the emulator and (iii) Have the main procedure start emulation at the entry point of the original executable. Given this construction, the result is a managed, portable and verifiable binary. Furthermore, it is as protected as a native binary, as the attacker of a native binary could easily take the native binary and follow the above construction.

In general, for binaries, experience and intuition indicate that the average IA32 binary is far more complex to understand and manipulate than the average managed binary. Some underlying reasons include (i) Variable instruction length; (ii) No clear distinction between code and data; and (iii) No clear distinction between constant data and relocatable addresses. Since instructions (opcode+operands) can have variable length (e.g., 1-17 bytes), instructions need only be byte-aligned, and can be mixed with padding data or regular data on the IA32, disassemblers can easily get out of synchronization. As there is no explicit separation between code and data, both can be read and written transparently and used inter-changeably. This allows for self-modifying code, a feature that is renowned for being difficult to analyze and to confuse attackers.

The feature that the binary representation of the code can easily be read has been used to enable self-checking mechanisms while absence of restrictions on control flow has enabled techniques such as control flow flattening and instruction overlapping.

The fact that addresses can be computed and that they cannot easily be distinguished from regular data, complicates tampering with binaries. For example, an attacker can only make local modifications, as he does not have sufficient information to relocate the entire binary. Such observations may be used to generate an exemplary custom ISA that proves hard to analyze ISA. Such an ISA may add security.

While exemplary techniques may include self-modifying code in an ISA and/or control flow flattening and/or instruction overlapping, specific examples discussed herein include provisions for variable length of instructions and use of the binary representation of parts of a program for increased tamper-resistance, which may be considered as related to some self-checking mechanisms.

Software often knows things it does not want to share in an uncontrolled manner. For example, trial versions may contain the functionality to perform a given task, but a time limitation might prevent from using it for too long. In digital containers, software is often used to provide controlled access to the contents. Mobile agents may contain cryptographic keys which need to remain secret.

To confound an attack, exemplary approaches include (i) Making the program different for different installations; (ii) Making the program different over time through tailored updates; and (iii) Making the program different for every execution through runtime randomizations.

Figure 2:
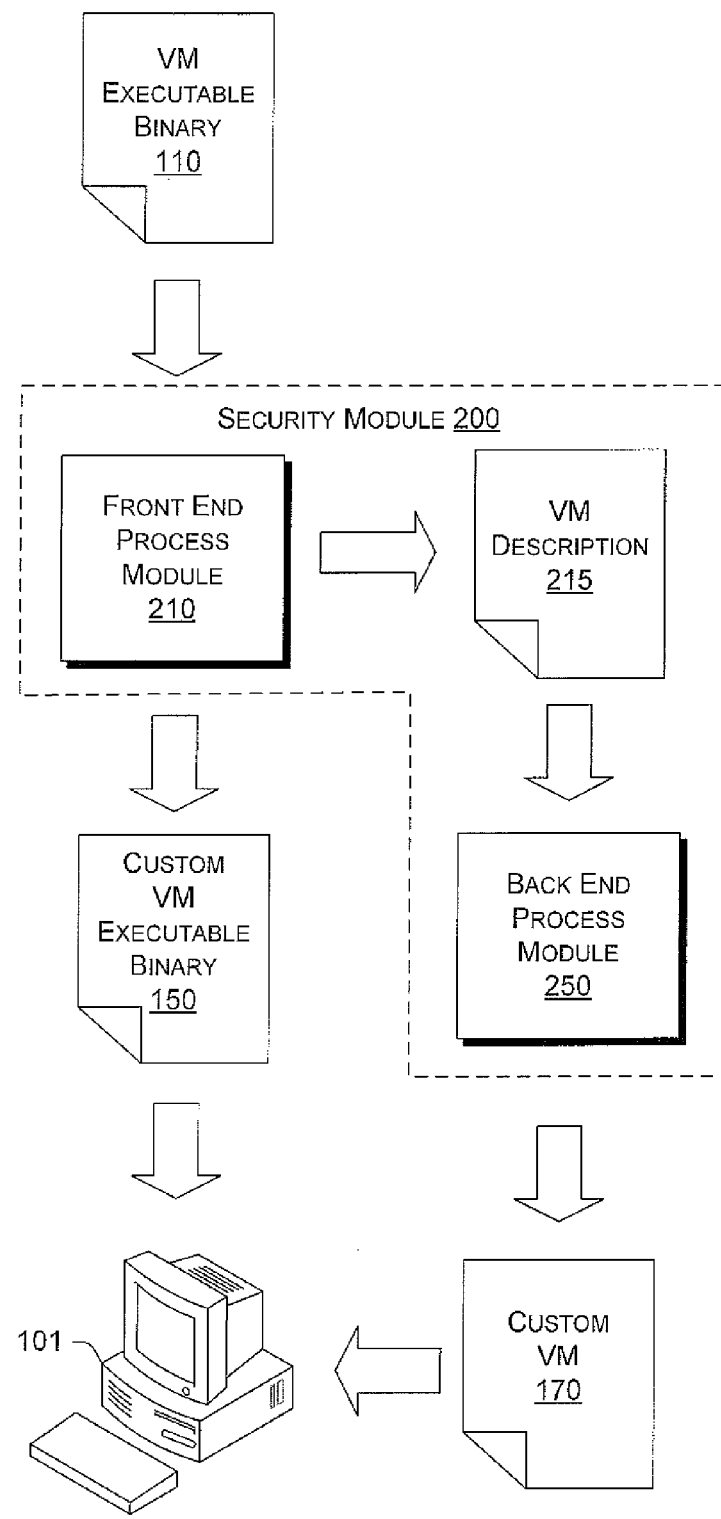
FIG. 2 is a block diagram of an exemplary method that includes a security module to generate custom code and/or a custom VM.

FIG. 2 shows an exemplary security module 200 implemented in conjunction with a framework that runs portable executable files on a virtual machine. The security module 200 includes a front end process module 210 and a back end process module 250. The front end process module 210 reads an executable binary file 110 that targets a VM and produces a custom executable binary file 150 that targets a modified version of the original target VM or a custom VM. In either instance, the front end process module 210 can use the file 110 to determine information about the original target VM, such as a VM description 115. The back end process module 250 can use the VM description 215 to generate code, a dll, etc., for a custom VM 170. For example, a conventional VM may be shipped as a shared library or dll (e.g., a "native" library) and such techniques may be used for a custom VM, noting that where a VM operates on top of a VM, specifics of the underlying VM may be accounted for in the form and/or characteristics of a custom VM. For the sake of convenience, the term "custom" as applied to a VM may include a modified VM (e.g., a modified version of the original target VM of code).

In an example aimed at the .NET™ framework, the front end process module 210 reads a managed MSIL binary 110, runs a few times over the code to determine its ISA, and produces an XML description 215 of its targeted VM. Once the ISA has been determined, the module 210 can rewrite the original binary into the custom bytecode language 150.

Figure 3:
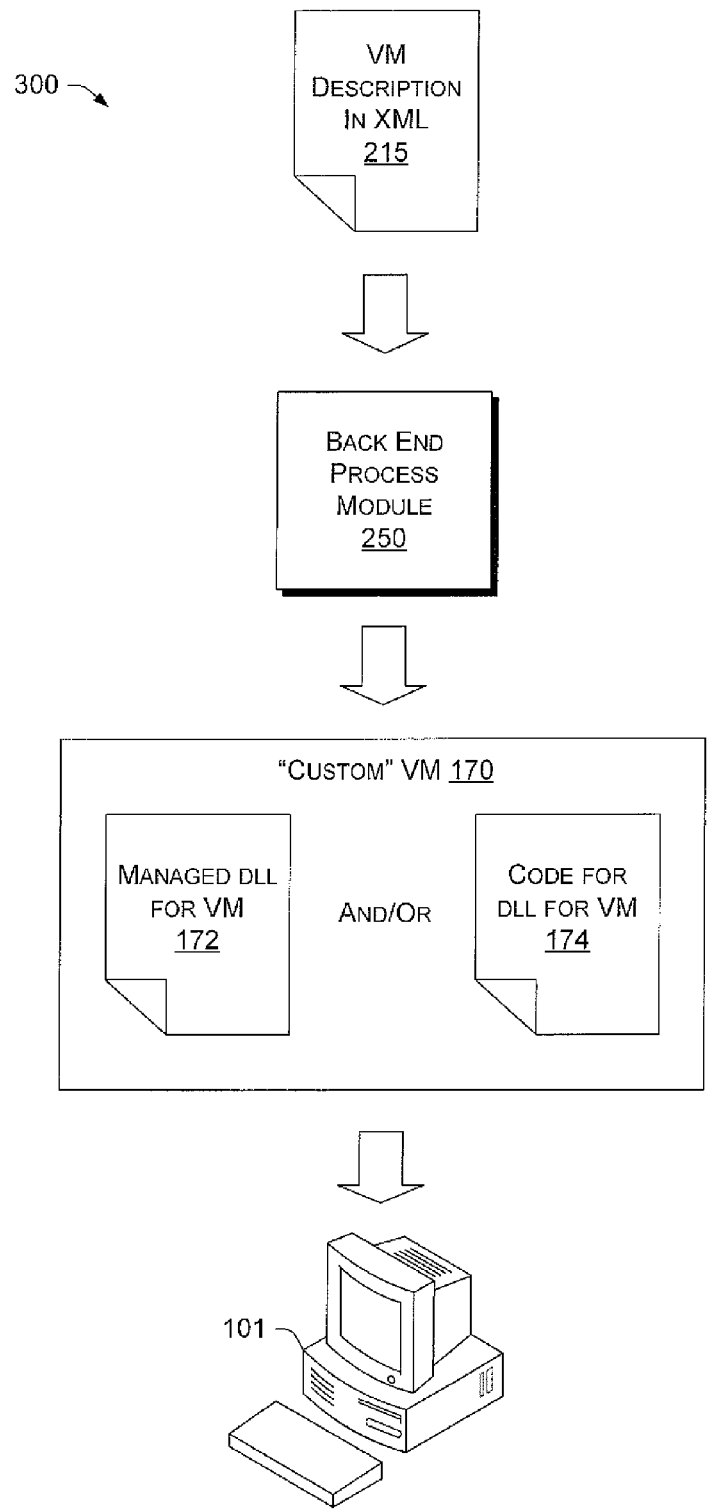
FIG. 3 is a block diagram of an exemplary method for generating a custom VM.

FIG. 3 shows an exemplary method 300 where the back end process module 250 reads the XML description 215 and creates a managed dll for a custom VM 172. The separation in a back end and front end is somewhat artificial, but it does allow for a more modular design and can facilitate debugging. For example, the back end process module 250 can be instructed to output C# code 174 instead of compiling a dll directly (see, e.g., 172). The code 174 can then be inspected and debugged separately.

Figure 4:
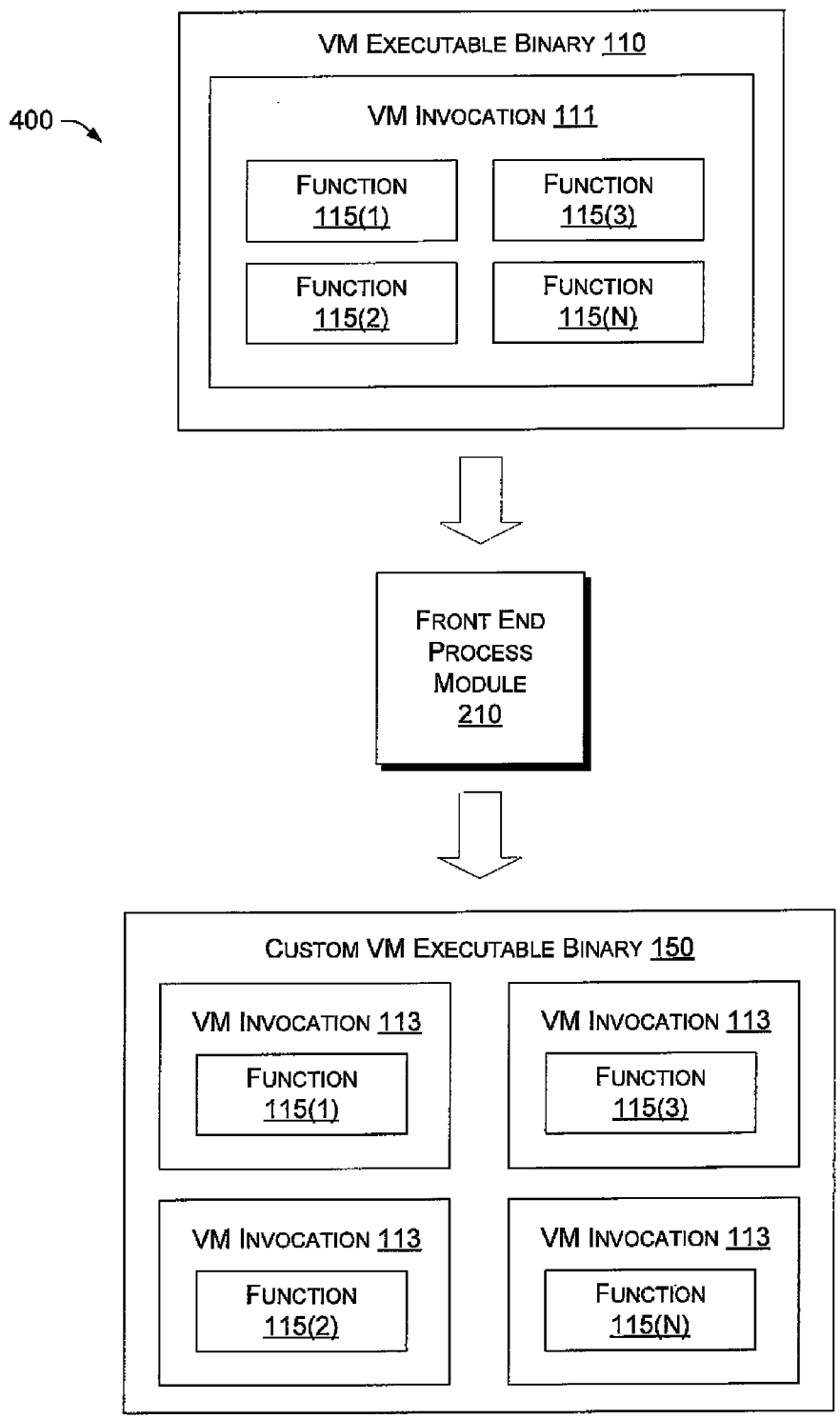
FIG. 4 is a block diagram of an exemplary method for diversifying functions in code to generate custom code.

FIG. 4 shows an exemplary method 400 where various parts of the original binary are retained. More specifically, the original VM executable binary 110 includes a wrapper 111 around functions 115(1)-(N) and the front end process module 210 rewrites every function 115(1)-(N) into a wrapper 113 which calls the VM, passing the necessary arguments. In such an example, all arguments may be passed in an array of objects. For "instance" functions, the method 400 includes the "this" pointer as well. As the method 400 operates on all functions to place each as a single structure, the front end process module 210 can also provide for passing an identification of the entry point of each function. In addition, the front end process module 210 may provide features to ensure that a returned object is cast to the return type of the original function, where appropriate.

Figure 5:
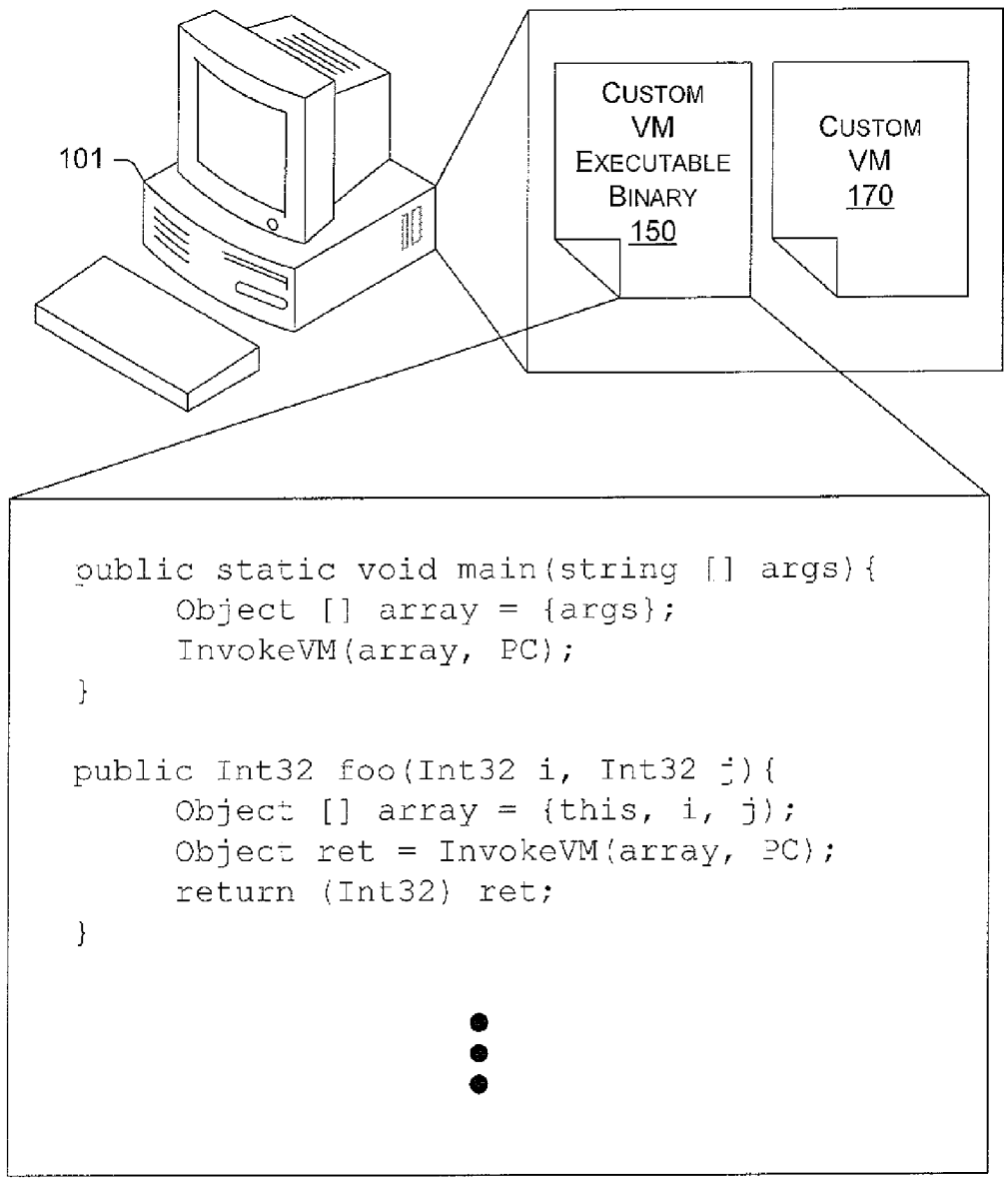
FIG. 5 is a diagram of an example that relates to the method of FIG. 4.

FIG. 5 shows a particular implementation of the method 400 in more detail. In this example, the front end process module 210 has converted functions into stubs using a wrapper that invokes a VM. More specially, the function "foo" is wrapped with the call "InvokeVM".

Figure 6:
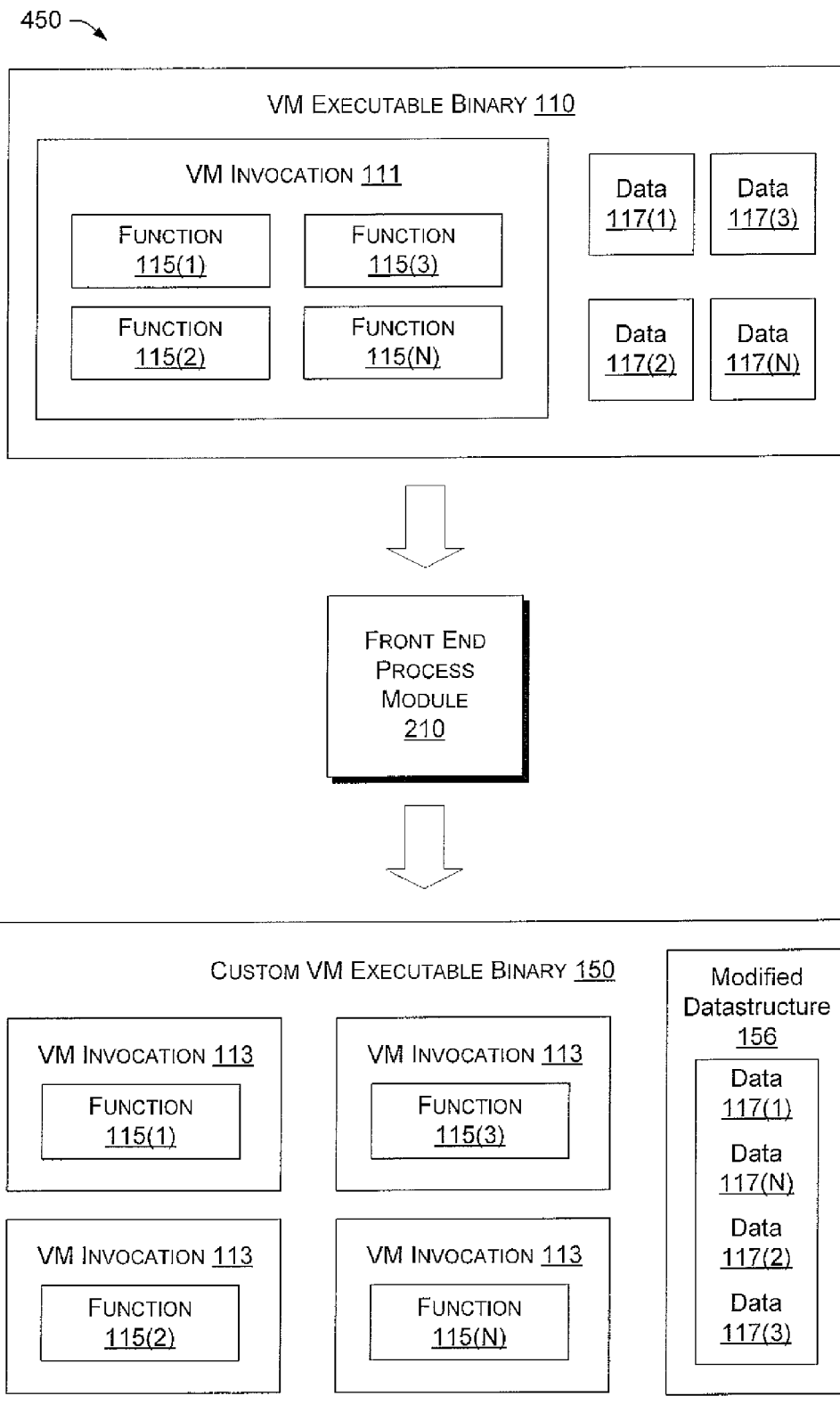
FIG. 6 is a block diagram of an exemplary method for diversifying data and/or data structure.

As already mentioned, data or data structure may provide a means for diversification. FIG. 6 shows an exemplary method 450 where the exemplary front end process module 210 receives a binary 110 with data 117(1)-(N) in an original data structure and outputs a custom binary 150 with data 117(1)-(N) in a modified or custom data structure 156. While the method 450 also shows wrapping of functions 115(1)-(N), an exemplary method may generate a custom binary by diversifying code, diversifying data, and/or diversifying code and data. The phrase "diversification of data" may include diversification of data and diversification based on data structure.

Exemplary methods that include rewriting the original program on a per-function basis only have an advantage in that things like garbage collection do not become an issue, as data structures are still treated as in the original program. Where techniques are applied for obfuscating, diversifying and making data more tamper-resistant, modifications may provide for tasks like garbage collection.

FIGS. 1-6, described above, illustrate how virtualization can be used to enhance security. More specifically, a front end process module can be used to generate a custom binary code and a back end process can be used to generate a custom VM to execute the custom binary code. FIGS. 7-14, described below, illustrate how specific features of an ISA and/or a VM may be used to enhance security through diversification.

With respect to managed code and various exemplary techniques presented herein, the choice between managed MSIL for the CLR and Java™ bytecode for the Java Runtime Environment (JRE) is somewhat arbitrary as various exemplary techniques can be transferred from the .NET™ to the Java™ domain. Further, techniques for obfuscating Java™ bytecode can be applied to managed MSIL binaries. The discussion that follows focuses primarily on exemplary techniques that stem from an "added" or custom virtualization layer. Automated diversification of distributed copies, for example, via Internet distribution is continually gaining acceptance. Hence overhead introduction of any of the exemplary techniques is increasingly economically viable.

Various exemplary techniques can introduce protection automatically at a point where human interaction is no longer required. It is theoretically possible to generate an unmanageable number of diverse semantically equivalent programs: Consider a program with 300 instructions and choose for every instruction whether or not to prepend it with a no-op. This yields $2^{300}$ different semantically equivalent programs and $2^{300}$ is larger than $10^{87}$, the estimated number of particles in the universe.

However, uniqueness is not necessarily sufficient as the resulting programs should be diverse enough to complicate the mapping of information gained from one instance onto another instance. Furthermore, the resulting programs should preferably be non-trivial to break. While it is unreasonable to expect that the codomain of various exemplary diversification techniques will include every semantically equivalent program, a goal can be set to maximize the codomain of a diversifier since the bigger the space, the easier it becomes to obtain internally different programs.

An exemplary approach starts from an existing implementation of semantics, rather than from the semantics itself. Through a number of parametrizable transformations different versions are obtained. In various examples that follow, a number of components of an ISA are identified that can be individualized independently.

Figure 7:
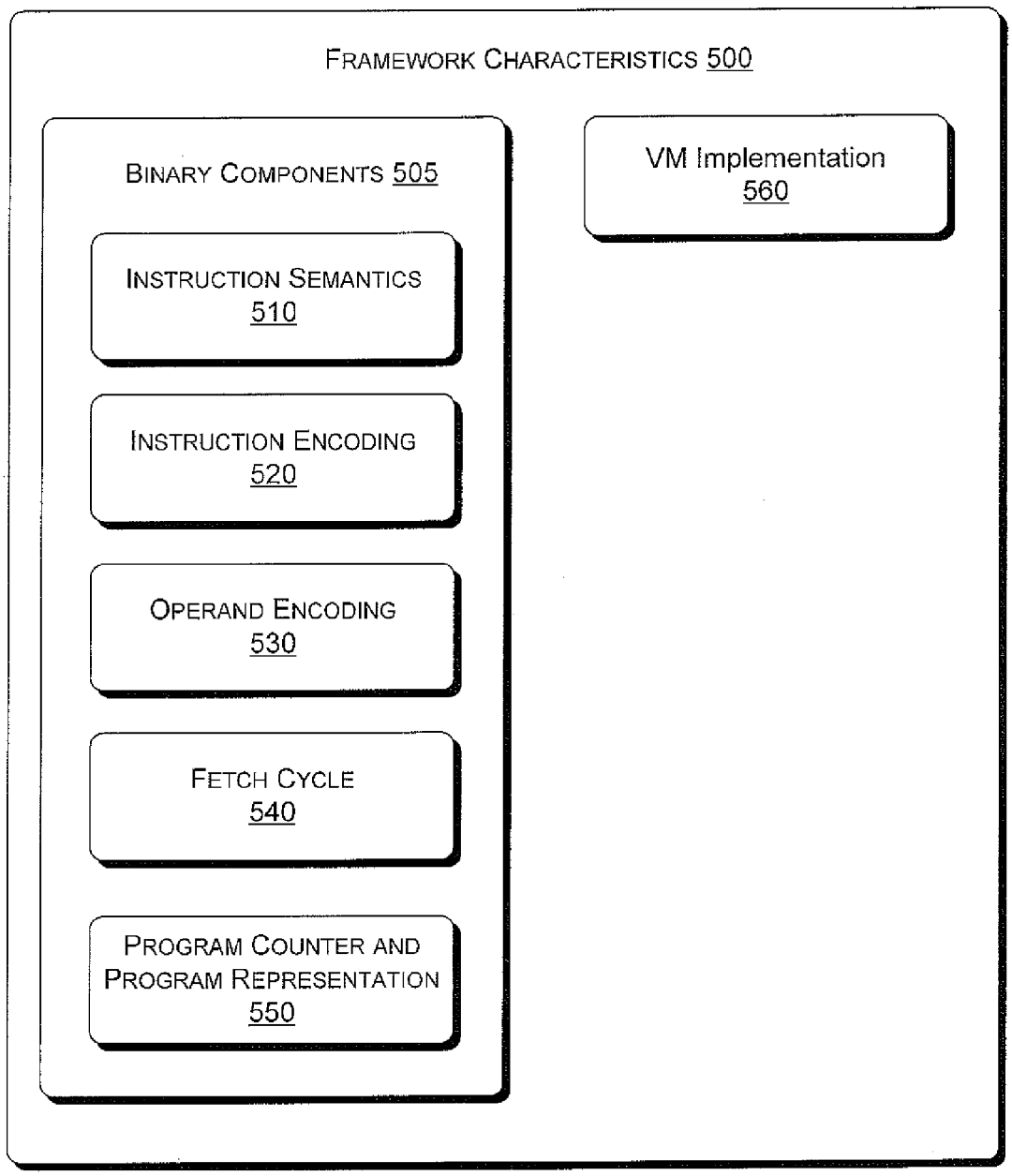
FIG. 7 is a block diagram of various framework characteristics that can be used for diversification and tamper-resistance.

FIG. 7 shows exemplary framework characteristics 500 grouped as binary components 505 and a VM implementation component 560. The binary components 505 include instruction semantics 510, instruction encoding 520, operand encoding 530, fetch cycle 540 and program counter (PC) and program representation 550. These components can be individualized in an orthogonal way, as long as the interfaces are respected. The components 505 are sufficient to generate a binary in a custom bytecode language; i.e., to determine an exemplary custom ISA. In addition, diversification may occur by diversifying the target VM or a custom VM (see, e.g., the VM implementation component 560).

Figure 8:
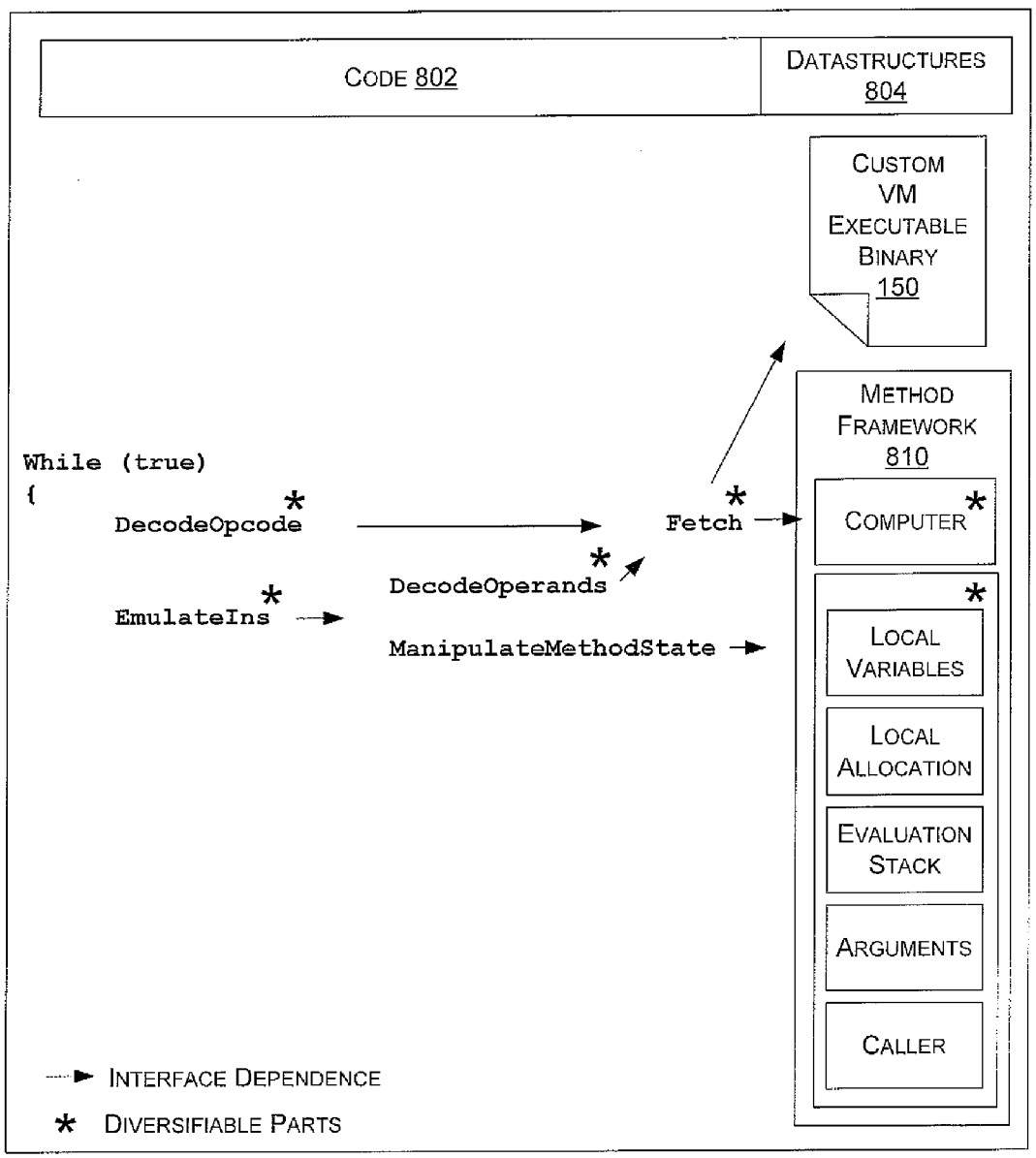
FIG. 8 is a diagram of an execution model with characteristics that can be used for diversification and tamper-resistance.

FIG. 8 shows an execution model and interfaces 800. The model 800 includes code 802, data structure 804, a method framework 810 and a custom binary 150. In FIG. 8, arrows represent interface dependencies and asterisks represent some diversifiable parts. An exemplary approach that uses such a model allows for a modular design and independent development.

According to the model 800 and the framework 500, diversification may include (i) randomizing instruction semantics by building instructions through the combination of smaller instructions, (ii) choosing instruction semantics to enable increased semantic overlap, (iii) departing from the traditional linear code representation to representing the code as a data structure such as a self-adapting (splay) binary tree, (iv) assigning variable lengths to opcodes and operands to complicate disassembly and to make local modifications more difficult, (v) limiting the instruction set to give the attacker fewer options in analyzing and modifying code, (vi) making variable the mapping between bit patterns, opcodes and operands.

The code 802 in FIG. 8 gives a high-level overview of an execution engine based on a fetch-execute cycle. The main internal data structures of the VM are shown as the method framework 810. As already mentioned, arrows indicate interface dependence. For example, DecodeOpcode expects to be able to fetch a number of bits.

Figure 9:
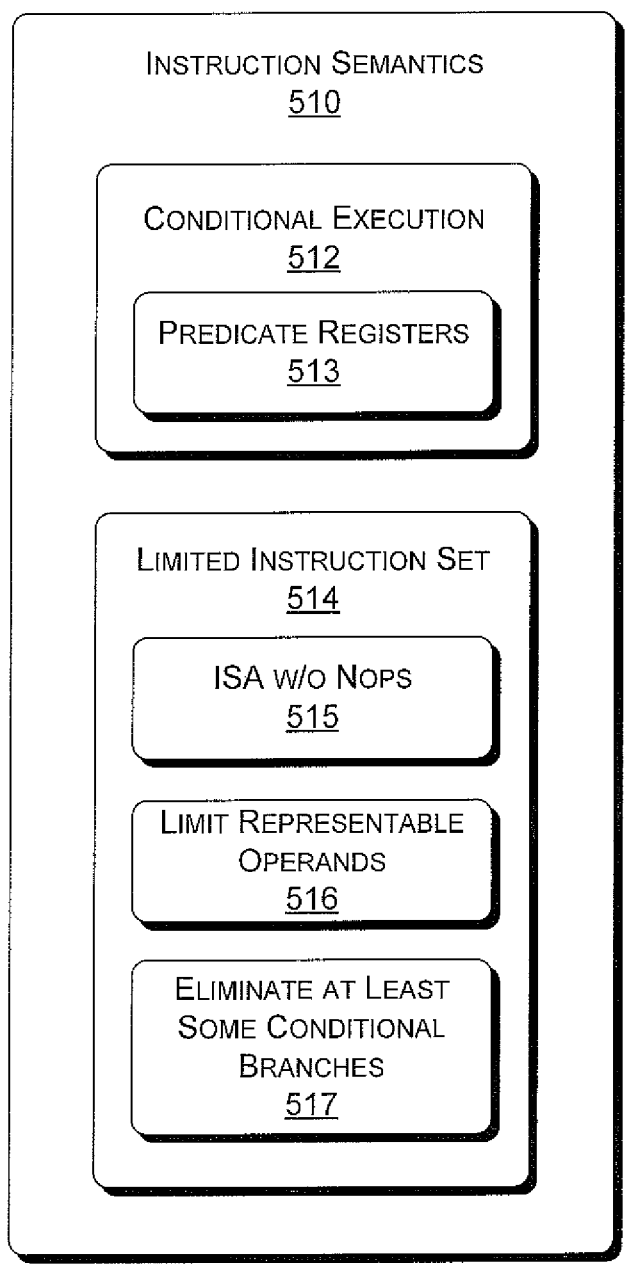
FIG. 9 is a block diagram of various approaches that can be applied to instruction semantics for purposes of diversification and tamper-resistance.

FIG. 9 shows the instruction semantics 510 of FIG. 5 and some features that may be used for diversification. The concept of micro-operations can allow for the diversification of instruction semantics. For example, an instruction in a custom bytecode language (e.g., per a custom ISA) can be any sequence of a predetermined set of micro-operations. For MSIL, the set of micro-operations currently includes verifiable MSIL instructions and a number of additional instructions to: (i) Communicate meta-information required for proper execution and (ii) Enable additional features such as changing semantics (described in more detail further below).

This can be compared to the concept of micro-operations (uops) in the P6 micro-architecture. Each IA32 instruction is translated into a series of ops which are then executed by the pipeline. This could also be compared to super-operators. Super-operators are virtual machine operations automatically synthesized from combinations of smaller operations to avoid costly per-operation over-heads and to reduce executable size.

An exemplary method may include providing stubs to emulate each of the micro-operations and these can be concatenated to emulate more expressive instructions in a custom bytecode language (e.g., a custom ISA), noting that many emulation functions may rely heavily upon reflection.

Consider an example using the following MSIL instructions (addition, load argument and load constant) and their emulation stubs (which have been simplified):

```
Idarg Int32:
    EvaluationStack.Push (
        ArgsIn.Peek(getArgSpec(insNr) );
Idc Int32:
    EvaluationStack.Push (
        getInt32Spec(insNr) );
add:
    EvaluationStack.Push (
        (Int32)EvaluationStack.Pop( ) +
        (Int32)EvaluationStack.Pop( ) );
```

Suppose that, during the instruction selection phase, we want to create a custom bytecode instruction with the following semantics:

CustomIns n i: load the nth argument, load the constant i and add these two values. This instruction is then assigned to a "case"-statement (e.g., 1) in a large "switch"-statement. The case-statement is the concatenation of the different emulation stubs of the micro-operations:

```
switch(insNr) {
...
case 1:
    //Concatenation of stubs
    break;
...
}
```

With respect to tamper-resistance, lack of knowledge of the semantics of an instruction will complicate program understanding, as opposed to having a manual in which semantics is specified. To go one level further, a custom tamper-resistant ISA may choose instruction semantics as adhering to some design principle(s).

Referring again to FIG. 9, conditional execution 512 may be used, optionally in conjunction with predicate registers 513 to increase tamper resistance. Conditional execution can further promote merging slightly differing pieces of code. In the presence of conditional execution, instructions can be predicated by predicate registers. If the predicate register is set to false, the instruction is interpreted as a no-op (no operation), otherwise, the instruction is emulated. Using this approach, registers are set on or along different execution paths to be able to execute slightly different pieces of code.

An exemplary method may include providing code sequences a, b, c and a, d, c in two different contexts in an original program and then "merging" the code to a, [p1]b, [p2]d, c where p1 is set to "true" and p2 is set to "false" to execute code in the first context and vice versa to execute code in the second context. As a result of settings one or more predicate registers differently, different pieces of code may be executed (e.g., a, b, no-op, c and a, no-op, d, c).

A limited instruction set 514 may be used to increase tamper resistance. For example, a custom ISA may lack no-ops 515, limit representable operands 516 and/or eliminate at least some conditional branches 517. Another approach may tailor a custom VM to a specific program(s); thus, an exemplary approach may ensure that the VM can only emulate operations that are required by that program.

Referring again to a custom ISA without no-ops 515, this approach accounts for a common attack technique that removes "undesired" functionality (e.g., a license check or decreasing the health of a wounded game character) by overwriting such functionality with no-ops. In many instances, there is little reason to include a no-op instruction in a custom ISA and not having this instruction will complicate an attacker's attempt to pad out unwanted code.

With respect to limiting representable operands 516, statistics show that, for example, of the integer literals from some 600 Java™ programs (1.4 million lines in all) 80% are between 0-99, 95% are between 0 and 999 and 92% are powers of two or powers of two plus or minus 1. Thus, an exemplary custom ISA may limit the number of representable operands, again limiting the freedom of an attack.

Another exemplary approach can modify or restrict use of at least some conditional branches 517. For example, usually, there are two versions for each condition: "Branch if condition is set and branch if condition is not set". Since use of two branches is redundant, a custom ISA could include rewriting code so that only one version is used and its counterpart not included in the ISA. This exemplary technique may be useful, for example, when a license check branches conditionally depending on the validity of the serial number. It will prevent the attacker from simply flipping the branch condition.

Figure 10:
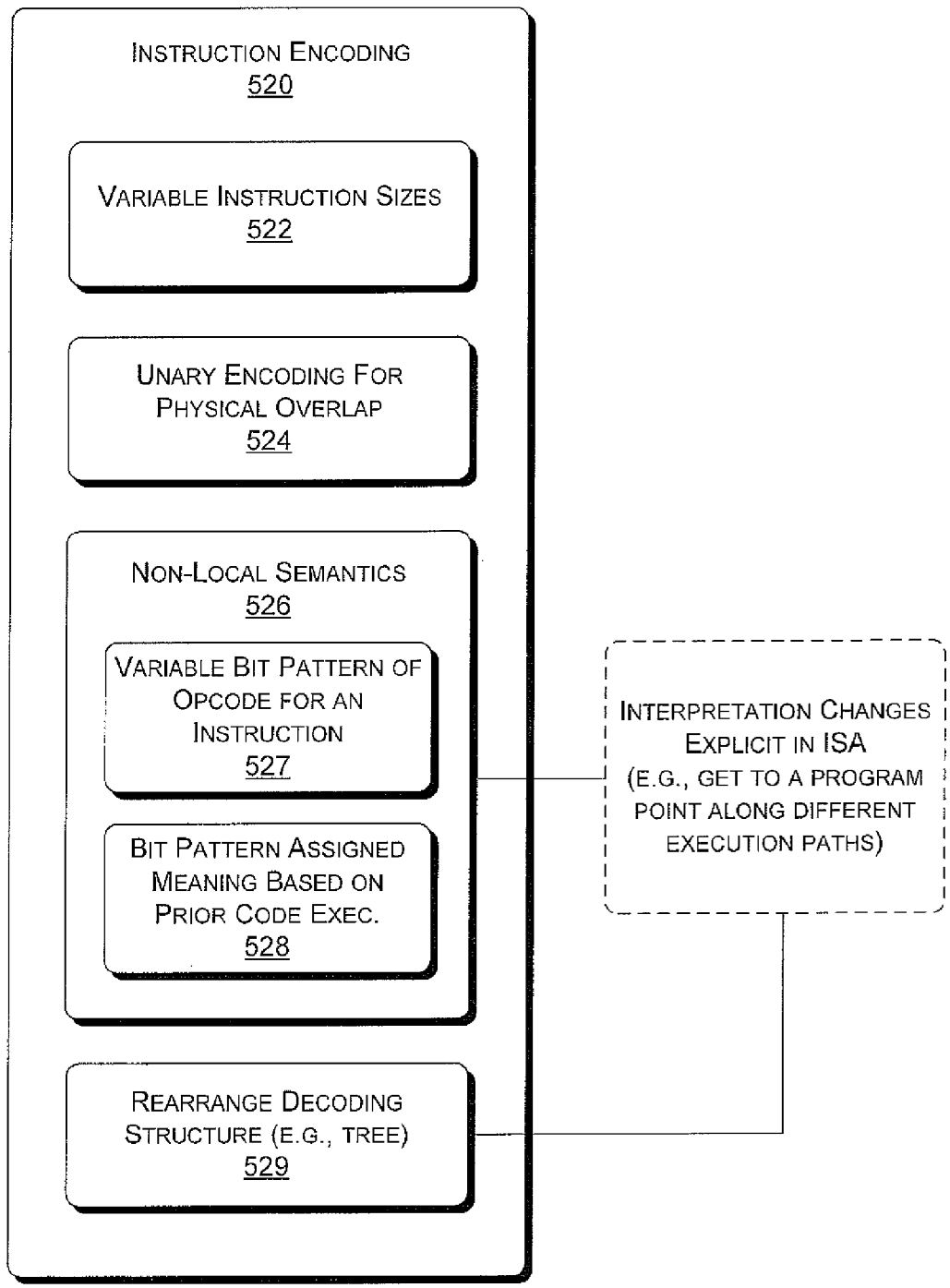
FIG. 10 is a block diagram of various approaches that can be applied to instruction encoding for purposes of diversification and tamper-resistance.

FIG. 10 shows the instruction encoding block 520 of FIG. 5 with various aspects of instruction encoding that can be used for diversification. More specifically, the aspects include variable instruction sizes 522, unary encoding for physical overlap 524, non-local semantics 526 and rearranging decoding structure 529.

Once instruction semantics has been determined, a need exists to determine an opcode encoding for those instructions. The size of all opcodes for traditional architectures is usually constant or only slightly variable. For example, MSIL opcodes are typically one byte, with an escape value (Oxfe) to enable two byte opcodes for less frequent instructions. The limited variability facilitates fast lookup through table interpretation. But, more generally, any prefix code (no code word is a prefix of any other code word) allows for unambiguous interpretation.

In its most general form, decoding opcodes to semantics can be done through a binary-tree traversal. Decoding normally starts in the root node; when a 0 bit is read, a move to the left child node occurs; when a 1 bit is read, a move to the right child node occurs. When a leaf node is reached, the opcode has been successfully decoded (e.g., consider a leaf node that contains a reference to the case-statement emulating the semantics of the instruction).

If a custom ISA allows arbitrary opcode sizes, without illegal opcodes, the number of possible encodings for n instructions is given by the following equation:

$$\frac{\binom{2(n-1)}{n-1}}{n} n! \quad (3)$$

In Eqn. 3, the fraction represents the number of planar binary trees with n leaves (Catalan number), while the factorial represents the assignment of opcodes to leaves. If fixed opcode sizes were chosen with the shortest possible encoding, i.e. log 2(n) bit, it might introduce illegal opcodes. In this case, the number of possible encodings is given by the following representation (Eqn. 4):

$$\binom{2^{\lceil log_2(n) \rceil}}{n} \quad (4)$$

Many more possibilities would arise if the custom ISA allowed illegal opcodes for other reasons than minimal fixed opcode sizes. However, this may increase the size of a binary written in the custom ISA without offering advantages.

In various examples presented herein, directed to the .NET™ framework (e.g., MSIL), the following modes can be supported: (i) Fixed length opcodes with table lookup; (ii) Multi-level table encoding to enable slightly variable instruction sizes (escape codes are used for longer opcodes) and (iii) Arbitrary-length opcodes with binary-tree traversal for decoding. Such modes can be applied to other frameworks as appropriate.

With respect to tamper resistance, again, not knowing the mapping from bit sequences to semantics introduces a learning curve for an attacker, for example, as compared to having such information in a manual. A number of additional approaches exist to choose a mapping in such a way that it allows for tamper-resistance properties.

As already mentioned, the instructions encoding block 520 of FIG. 10 includes a variable instruction size approach 522. For example, custom ISA can introduce even more variance in the length of opcodes than allowed in a CISC binary. Variable instruction sizes can also be used to make local modifications more complicated. In general, a larger instruction cannot simply replace a smaller instruction, because it would overwrite the next instruction. A custom ISA can also ensure that smaller non-control-transfer instructions cannot replace larger instructions. For example, this can be accomplished by ensuring that such instructions cannot be padded out to let control flow to the next instruction.

Consider a code or ISA with 64 instructions where each of the instructions may be assigned a unique size in a range of bits (e.g., between about 64 bits and about 127 bits). Clearly, larger instructions do not fit into the space of smaller instructions. Further, smaller instructions do fit in the space of larger instructions. Yet, when control falls through to the next bit, there is no instruction available to pad out the remaining bits with no-ops to make sure that control flows to the next instruction. Hence, under this scheme it is useful to make control-transfer instructions the longest, to keep an attacker from escaping to another location where he can do what he wants.

The instruction encoding block 520 also includes a unary encoding approach 524 to achieve, for example, physical overlap. A unary encoding approach can entangle a program by increasing or maximizing physical overlap. For example, such an approach may be able to jump into the middle of another instruction, and start decoding another instruction. This approach can be facilitated by choosing a good encoding. For example, unary encoding can be used to encode the opcodes $(0, 01, 001, \ldots, 0^{63}1)$. In this example, there is a good chance that one finds another instruction when jumping one bit after the beginning of an instruction:

| | |
|---|---|
| 1: | add |
| 01: | mul |
| 001: | sub |
| 0001: | div |

Above, four instructions have been assigned an opcode using unary encoding. In this example, if decoding starts at the second bit of the divide instruction (div), the subtract instruction (sub) is revealed. Likewise, looking at the last bit of the divide, subtract and multiply (mul) instruction reveals add instruction.

Another approach for a custom ISA related to instruction encoding uses non-local semantics 526. Having a unique bytecode language for every distributed copy erects a significant barrier against attackers.

In general, for an ISA, there is no documentation available on: (i) The mapping from bit patterns to instructions; (ii) The semantics of instructions; (iii) The mapping from bit patterns to operands; (iv) The representation of data-structures; etc. However, such mappings or representations may eventually be learned by an attacker through static or dynamic inspection. To confound an attack, a custom ISA can use non-local semantics 524 to ensure that a bit pattern has different meaning along different execution paths.

A binary program is just a sequence of "1"s and "0"s, which is given meaning by a processor. The meaning between bit patterns and interpretation is typically fixed by the ISA. On traditional architectures, if the opcode of a certain instruction is represented by a given bit pattern, this pattern is constant for every binary, everywhere it occurs. A custom ISA can make any particular bit pattern variable, noting that not all instruction bit patterns need to be made variable to erect a significant barrier against attack. Hence, the non-local semantics block 526 includes a variable bit pattern block 527 approach, for example, for an opcode for an instruction.

In a custom ISA, a bit pattern may only be assigned meaning depending on previously executed code. To make the interpretation depend on previously executed code, depending on the (fully specified) input, a custom ISA can allow getting to a program point along different execution paths. However, such a custom ISA may still want to have control over the interpretation of bits at a given program point. To accommodate this variability, a custom ISA can make interpretation changes explicit rather than implicit as a side effect of some other event. Hence, the non-local semantics block 526 includes a bit pattern block 528 approach, for example, to assign meaning based on prior code execution. Further, the non-local semantics block 526 links to interpretation changes explicit in the custom ISA, for example, to get to a program point along different execution paths.

An exemplary method includes generating diverse copies of a program using instruction encoding to rearrange a decoding structure to thereby allow for getting to a point in the program along two or more execution paths where an assigned meaning of a bit pattern at the point depends on the execution path to the point. For example, such a method may assign meaning based on prior code execution, which may differ for different execution paths.

A custom ISA may aim to not limit complexity with respect to getting an executing environment in a specific interpretation state. In other words, such an approach may ensure that, if getting to a program point from different execution paths in different interpretation states is allowed, it can be relatively easily to migrate to a single target interpretation state no matter what the different interpretation states may be.

A particular approach involves rearranging structure 529. For example, changing interpretation may amount to nothing more than rearranging a decoding tree. Taking into account the previous observations, a custom ISA may only allow a limited form of diversification. To this end, a custom ISA may have a chosen level at which subtrees (or other substructures) can be moved around. Such a choice is a trade-off between how many different interpretations are possible and how easy it is to go to a fixed interpretation from a set of possibly different interpretation states.

In an example, consider choosing the third level of a tree structure. Assuming that the shortest opcode is 3 bit, this allows for 8! interpretation states, while any interpretation state is reachable in at most 8 micro-operations. Such an approach can be applied to a set of MSIL micro-operations. For example, consider the following micro-operations:

Swap(UInt3 position1, UInt3 position2),which exchanges the nodes at position position1 and position2 and Set(UInt3 label, UInt3 position),which exchanges the node with label (wherever it may be) and the node at position position.

In the case of table interpretation, this is implemented as a two-level table interpretation. The first level can refer to other tables which can be swapped.

In the foregoing example, micro-operations largely correspond to MSIL instructions and the operand types correspond largely to MSIL operand types. Micro-operation emulation stubs that use operands use function calls to ensure that opcode encoding can be diversified orthogonally. Such callbacks furthermore pass an argument "insNr" identifying a custom VM instruction from which it was called (see, e.g., example of instruction semantics 510). This allows for encoding operands differently for different custom VM instructions. Note that due to the concatenation of stubs, an arbitrary number of operands can follow the opcode. Thus, the approach for operand encoding 530 may include such techniques. Hence, similar approaches for diversifying opcode encoding can be made as for instruction encoding.

Figure 11:
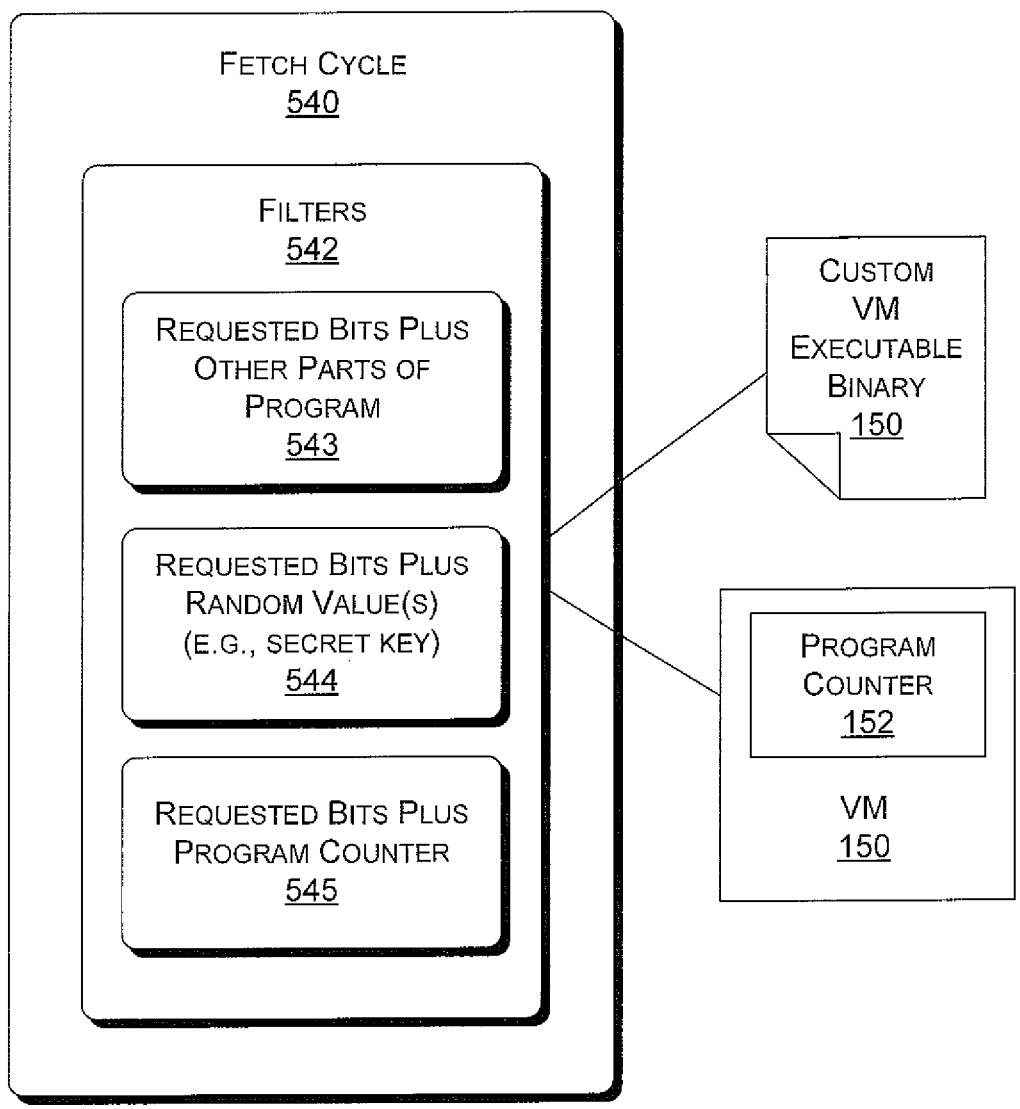
FIG. 11 is a block diagram of various approaches that can be applied to a fetch cycle for purposes of diversification and tamper-resistance.

Diversifying the fetch cycle may be considered an "artificial" form of diversification. FIG. 11 shows the fetch cycle block 540 as including various approaches that use "filters" 542. A basic "non-custom" fetch cycle simply gets a number of bits from a custom bytecode binary, depending on the current Program Counter (PC). However, use of one or more filters 542 allows for a custom fetch cycle that improves tamper-resistance. Such filter or filters can transform the actual bits in the binary to the bits that will be interpreted by the VM.

Fetch cycle filters 542 may add complexity by combining one or more requested bits with other information. For example, the actual requested bits may be combined with other parts of a program 543. In such a manner, a program becomes more inter-dependent as changing one part of the program may impact other parts as well. Other filter approaches include a filter that combines one or more bits with a random value 544 (e.g., derived from a secret key) and a filter that combines one or more bits with the program counter (PC) 545 to complicate pattern matching techniques.

The most traditional representation of code is as a linear sequence of bytes. In such an approach, a program counter (PC) simply points to the next byte to execute, and control transfers typically specify the byte to continue execution at as a relative offset or an absolute address. This may be essentially viewed as a structure that represents code as an array of bytes.

Figure 12:
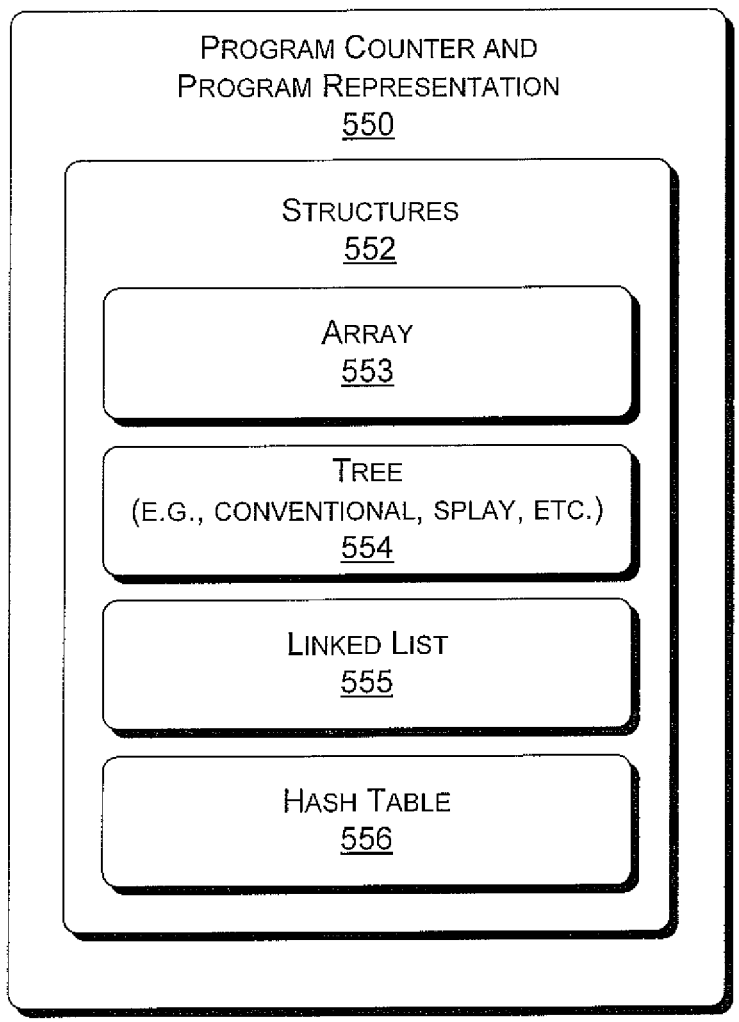
FIG. 12 is a block diagram of various approaches that can be applied to a program counter (PC) and/or program representation for purposes of diversification.

FIG. 12 shows the program counter and program representation block 550 along with various structural approaches, including array 553, tree 554, linked list 555 and hash table 556. A custom ISA may represent code as a splay tree such as the splay trees 1320 and 1330 of FIG. 13. While code may be represented as a splay tree, an exemplary approach for a custom ISA may alternatively or additionally represent data in a splay tree or other selected structure to enhance security. In general, such approaches can provide for diversification more readily than a traditional linear representation (see, e.g., linear approach 1310 of FIG. 13).

Splay trees have a number of advantages: They are self-balancing, which will allow for automatic relocation of code. Furthermore, they are nearly optimal in terms of amortized cost for arbitrary sequences. Finally, recently accessed nodes tend to be near the root of the tree, which allows for partial leverage of spatial and temporal locality present in most executables.

Because of the self-balancing property, a piece of code could be in many different locations in memory, depending on the execution path that led to a certain code fragment. Code fragments can be moved around, as long as there is a way to refer to them for control-flow transfers, and so that they can be retrieved when control is transferred to them. An exemplary structure approach uses keys of nodes in splay tree where control transfers specify the key of the node to which control needs to be transferred. In such an example, it is required that targets of control flow be nodes (i.e., cannot readily jump into the middle of the code contained within a node). In practice this means that execution starts a new node for each basic block. Fall-through paths can be handled by making all control flow explicit. In such an example, all control flow targets may be specified as the keys of the node containing the target code. Further, the size of the code in a node may be constant. Yet further, if a node is too small to contain an entire basic block it can overflow to another node and continue execution there.

Figure 13:
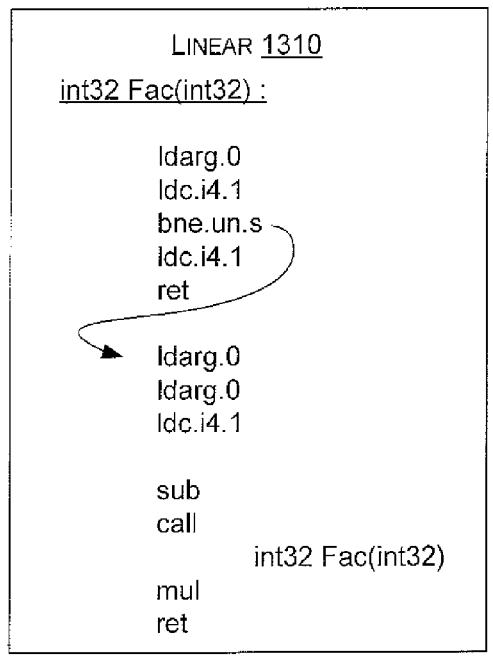
FIG. 13 is a diagram of an example of a code fragment in a splay tree, for purposes of diversified tamper-resistance.
Figure 13:
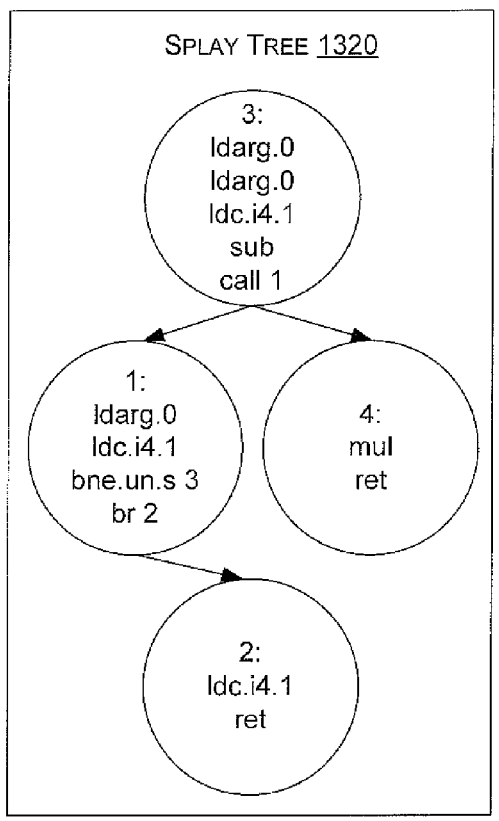
Figure 13:
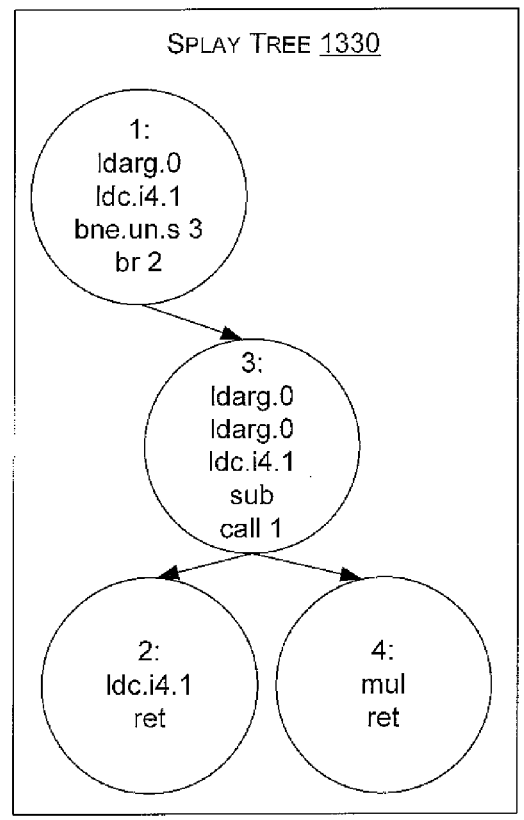
Figure 14:
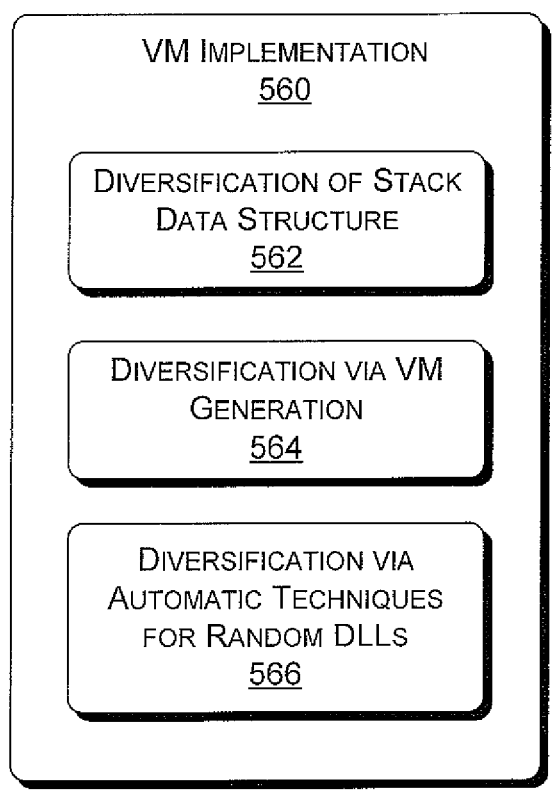
FIG. 14 is a block diagram of various approaches that can be applied to implementation of a virtual machine (VM) for purposes of diversification.

FIG. 13 illustrates an exemplary approach using splay trees 1320, 1330 for a given linear approach 1310 for a factorial function "Fac". When, for example, the function "Fac" is called for the first time, the node with key 1 will be referenced and percolated to the root, as shown in part (2). Another thing that is worth noting in this example is that calls no longer need to specify the function signature, as this code will not be subject to verification.

If such a technique is implemented naively, only pointers will be moved around, and the actual code will remain at the same place on the heap. To complicate this further, an explicit exchange of the actual contents (of primitive types) of the nodes can occur, or alternatively, an allocation of a new code buffer may occur along with copying of the code buffer to the allocated space, possibly with re-encryption and/or with different garbage padding.

Referring again to the framework characteristics 500 of FIG. 7, exemplary approaches may be applied to VM implementation 560. Some approaches are shown in FIG. 12. For a given internal implementation, an evaluation stack is not determined on the basis of the ISA (e.g., consider components 505). In such an example, emulation stubs for micro-operations may rely only on an interface which supports a number of operations such as "pop" and "push". An exemplary approach for an internal implementation of a stack data structure 562 introduces independent diversity via, for example, an array, a linked list, etc. An exemplary approach may optionally provide a number of different implementations of such interfaces.

Another approach aims to diversify VM generation 564. For example, once the parameters for the above specified forms of diversification are fully specified, an exemplary back end process may combine code snippets from various locations along with some auto-generated code to assemble a managed C# representation for the implementation of the custom VM. Alternatively, an exemplary back end process can directly output a dll.

Another exemplary approach involves diversifying dlls 566, for example, using randomizable versions of existing code transformations from various domains such as software optimization, software obfuscation, (non-virtualization-based approaches to) software diversification, etc.

While various exemplary techniques discussed herein generally introduce some overhead, where digital rights management, sensitive information (e.g., government, proprietary, etc.), licenses, etc., are involved, then such overhead may be tolerated, given the enhanced security introduced via diversification. In such instances, diversification techniques may be applied to the typically targeted areas and not applied to runtime features that require some degree of contemporaneous or "real-time" execution. For example, diversification may be applied to code associated with digital rights management and not to associated code that requires some form of digital rights OK prior to execution.

Virtualization opens up a wide range of possibilities for both diversity and tamper-resistance. Controlling an execution environment provides significant leverage to complicate the task of an attacker. While various examples refer to a particular framework for software protection based on the concept of virtualization, various approaches have also been identified where diversity and/or tamper-resistant features can be introduced in a largely independent way. Modular development and/or deployment can be used.

Figure 15:
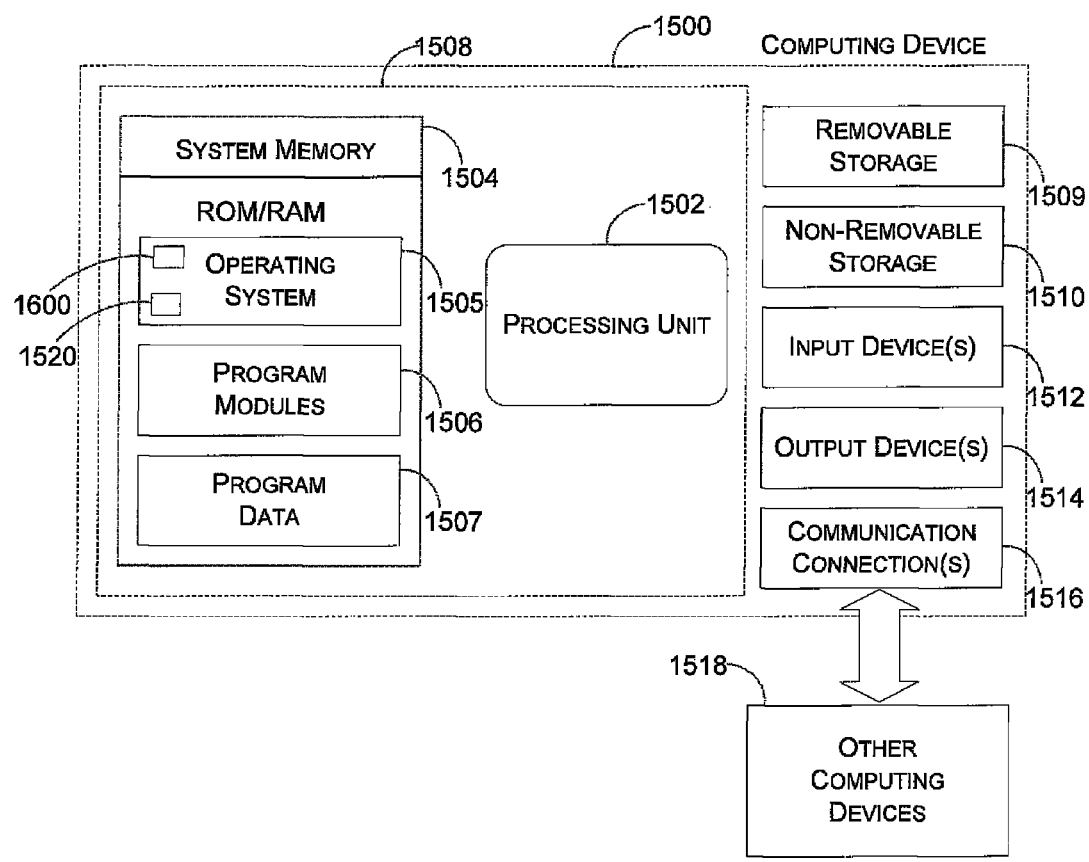
FIG. 15 is a block diagram of an exemplary computing device.

FIG. 15 illustrates an exemplary computing device 1500 that may be used to implement various exemplary components and in forming an exemplary system. For example, the servers and clients of the system of FIG. 1 may include various features of the device 1500.

In a very basic configuration, computing device 1500 typically includes at least one processing unit 1502 and system memory 1504. Depending on the exact configuration and type of computing device, system memory 1504 may be volatile (such as RAM), non-volatile (such as ROM, flash memory, etc.) or some combination of the two. System memory 1504 typically includes an operating system 1505, one or more program modules 806, and may include program data 1507. The operating system 1506 include a component-based framework 1520 that supports components (including properties and events), objects, inheritance, polymorphism, reflection, and provides an object-oriented component-based application programming interface (API), such as that of the .NET™ Framework manufactured by Microsoft Corporation, Redmond, Wash. The operating system 1505 also includes an exemplary framework 1600, such as, but not limited to, an exemplary framework with a custom ISA and/or custom VM. Further, the computing device 1500 may include a software module for generating a custom ISA and/or a custom VM. Yet further, the computing device 1500 may include a software module for testing a custom ISA and/or a custom VM. The computing device 1500 may include a software module for generating a custom code and/or a custom VM to, at least in part, execute a custom code. The device 1500 is of a very basic configuration demarcated by a dashed line 1508. Again, a terminal may have fewer components but will interact with a computing device that may have such a basic configuration.

Computing device 1500 may have additional features or functionality. For example, computing device 1500 may also include additional data storage devices (removable and/or non-removable) such as, for example, magnetic disks, optical disks, or tape. Such additional storage is illustrated in FIG. 15 by removable storage 1509 and non-removable storage 1510. Computer storage media may include volatile and nonvolatile, removable and non-removable media implemented in any method or technology for storage of information, such as computer readable instructions, data structures, program modules, or other data. System memory 1504, removable storage 1509 and non-removable storage 1510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1500. Any such computer storage media may be part of device 1500. Computing device 1500 may also have input device(s) 1512 such as keyboard, mouse, pen, voice input device, touch input device, etc. Output device(s) 1514 such as a display, speakers, printer, etc. may also be included. These devices are well know in the art and need not be discussed at length here.

Computing device 1500 may also contain communication connections 1516 that allow the device to communicate with other computing devices 1518, such as over a network (e.g., consider the aforementioned web or Internet network 103). Communication connections 1516 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implementable method comprising:
providing an instruction set architecture that includes features to generate diverse copies of a program that specifies a virtual machine, wherein the features to generate diverse copies of a program comprise instruction semantics that provide for conditional execution using predicate registers and instruction semantics with a limited instruction set;
using the instruction set architecture to generate diverse copies of the program, each diverse copy of the program being generated to target an associated modified version of the virtual machine; and
generating an associated modified version of the additional virtual machine for execution of one of the diverse copies of the program.

2. The method of claim 1 wherein the generating the associated modified version of the virtual machine comprises generating a virtual machine dynamic-link library (DLL).

3. The method of claim 1 wherein the limited instruction set does not include a "no operation" instruction (NOPS).

4. The method of claim 1 wherein the limited instruction set has a limited representation of operands.

5. The method of claim 1 wherein the limited instruction set limits at least some conditional branches.

6. The method of claim 1 wherein the features to generate diverse copies of a program comprise instruction encoding for variable instruction sizes.

7. The method of claim 1 wherein the features to generate diverse copies of a program comprise instruction encoding for assigning an opcode using unary encoding to introduce physical overlap.

8. The method of claim 1 wherein the features to generate diverse copies of a program comprise instruction encoding to introduce a variable bit pattern for an opcode for an instruction.

9. The method of claim 1 wherein the features to generate diverse copies of a program comprise instruction encoding to assign a bit pattern based on prior execution of an opcode.

10. The method of claim 1 wherein the features to generate diverse copies of a program comprise instruction encoding to rearrange a decoding structure to thereby allow for getting to a point in the program along two or more execution paths wherein an assigned meaning of a bit pattern at the point depends on an execution path to the point.

11. The method of claim 1 wherein the features to generate diverse copies of a program comprise one or more fetch cycle filters.

12. The method of claim 11 wherein the one or more fetch cycle filters comprises a filter that adds information to a requested bit or bits of a code.

13. The method of claim 12 wherein the information comprises a random value.

14. The method of claim 12 wherein the information comprises a program counter value or information based at least in part on a program counter value.

15. The method of claim 1 wherein the features to generate diverse copies of a program comprise at least one structure, selected from at least one of splay trees, linked lists or hash tables, to represent the program.

16. A memory having stored thereon processor-executable instructions for using the instruction set architecture of claim 1 to generate diverse copies of a program.

17. A computer-implementable method comprising:
analyzing code to determine a virtual machine targeted by the code;
modifying the virtual machine to specify a modified virtual machine;
generating a diversified virtual machine that is based at least in part on the modified virtual machine;
generating diversified code that targets the diversified virtual machine and is based at least in part on the code, wherein the diversified code includes instruction semantics that provide for conditional execution using predicate registers and instruction semantics with a limited instruction set; and
executing the diversified code using the diversified virtual machine.

18. A computer-implementable method comprising:
providing an architecture that comprises a first virtualization layer that controls hardware;
receiving a program that specifies a virtual machine;
modifying the program to target a modified version of the virtual machine to create a diversified copy of the program, the modified version of the virtual machine providing a second virtualization layer, wherein the diversified copy of the program includes instruction semantics that provide for conditional execution using predicate registers and instruction semantics with a limited instruction set; and
providing the second virtualization layer on top of the first virtualization layer, the second virtualization layer being configured to process the diversified copy of the program and allow for execution of the program using the first virtualization layer.

19. A computer implemented method for enhancing software security, the method comprising:
providing a base virtual machine virtualization layer that virtualizes an operating system that controls hardware,
receiving a program that specifies a targeted virtual machine;
modifying the program to create a diverse copy of the program that targets a modified version of the targeted virtual machine, wherein the diverse copy of the program includes instruction semantics that provide for conditional execution using predicate registers and instruction semantics with a limited instruction set;
providing the diverse copy of the program to a custom virtual machine that one or more additional virtualization layers wherein at least one of the one or more additional virtualization layers virtualizes an instruction set of the base virtual machine, the modified version of the targeted virtual machine being based on the custom virtual machine; and
virtualization layer executing the diverse copy of the program by the custom virtual machine.

20. A computer implemented method for enhancing software security, the method comprising:
analyzing a program code to determine a virtual machine targeted by the program code;
modifying the program code based on a modified version of the virtual machine to create an individualized copy of the program code, wherein the individualized copy of the program code includes instruction semantics that provide for conditional execution using predicate registers and instruction semantics with a limited instruction set;
providing a custom second virtual machine for execution of the individualized copy of the program code, the modified version of the virtual machine being modified, based at least in part on an internal implementation of the custom virtual machine, the second custom virtual machine being operable to vary program operation at runtime.

* * * * *